(12) United States Patent
Shimizu

(10) Patent No.: US 10,116,833 B2
(45) Date of Patent: Oct. 30, 2018

(54) IMAGE PROCESSING DEVICE, IMAGE PROCESSING METHOD AND PROGRAM FOR ANIMATION DISPLAY

(71) Applicant: Sony Semiconductor Solutions Corporation, Kanagawa (JP)

(72) Inventor: Akira Shimizu, Saitama (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 84 days.

(21) Appl. No.: 15/502,977

(22) PCT Filed: Aug. 28, 2015

(86) PCT No.: PCT/JP2015/074339
§ 371 (c)(1),
(2) Date: Feb. 9, 2017

(87) PCT Pub. No.: WO2016/039167
PCT Pub. Date: Mar. 17, 2016

(65) Prior Publication Data
US 2017/0230539 A1 Aug. 10, 2017

(30) Foreign Application Priority Data
Sep. 12, 2014 (JP) ................................. 2014-185968

(51) Int. Cl.
*G06T 3/40* (2006.01)
*H04N 1/393* (2006.01)
*G06T 5/00* (2006.01)

(52) U.S. Cl.
CPC ............. *H04N 1/3935* (2013.01); *G06T 3/40* (2013.01); *G06T 5/002* (2013.01)

(58) Field of Classification Search
CPC .......... G06T 3/40; G06T 5/002; H04N 1/3935
See application file for complete search history.

(56) References Cited

U.S. PATENT DOCUMENTS

2004/0008155 A1* 1/2004 Cok ..................... G06F 3/1446
345/1.3
2004/0222941 A1* 11/2004 Wong ................... G06F 3/1431
345/1.1

(Continued)

FOREIGN PATENT DOCUMENTS

| JP | 08-009343 A | 1/1996 |
| JP | 11-065802 A | 3/1999 |
| JP | 2013-143476 A | 7/2013 |

*Primary Examiner* — Yubin Hung
(74) *Attorney, Agent, or Firm* — Michael Best & Friedrich LLP

(57) ABSTRACT

In one example, an image processing device includes a reduction scaler unit that reduces or maintains the image data of an input image. An enlargement scaler unit enlarges or maintains the image data and outputs the image data as the image data of an output image. The reduction scaler unit converts the resolution of the input image to an intermediate resolution in accordance with first image parameters related to an image to be supplied from the enlargement scaler unit, the intermediate resolution being a resolution for performing writing on the memory unit. The enlargement scaler unit converts the intermediate resolution of a memory-held image read from the memory unit to the resolution of the output image, in accordance with second image parameters related to an image to be supplied from the reduction scaler unit.

10 Claims, 29 Drawing Sheets

(56) References Cited

U.S. PATENT DOCUMENTS

| | | | |
|---|---|---|---|
| 2005/0219265 A1* | 10/2005 | Itoh | G09G 5/39 |
| | | | 345/629 |
| 2006/0269157 A1* | 11/2006 | Eruhimov | H04N 19/98 |
| | | | 382/254 |
| 2010/0201692 A1* | 8/2010 | Niles | G06T 13/20 |
| | | | 345/473 |
| 2012/0169773 A1* | 7/2012 | Suzuki | G09G 5/14 |
| | | | 345/660 |
| 2014/0160233 A1* | 6/2014 | Ishida | H04N 5/2258 |
| | | | 348/36 |

* cited by examiner

IMAGE PROCESSING DEVICE, IMAGE PROCESSING METHOD AND PROGRAM FOR ANIMATION DISPLAY

TECHNICAL FIELD

The present technology relates to an image processing device, an image processing method, and a program, and more particularly, to an image processing device, an image processing method, and a program for achieving both smooth animation display and higher image quality in non-animation display.

BACKGROUND ART

When content such as a television program is displayed, the display area is continuously changed at predetermined times. This is known as animation display (see Patent Document 1, for example).

CITATION LIST

Patent Document

Patent Document 1: Japanese Patent Application Laid-Open No. 11-65802

SUMMARY OF THE INVENTION

Problems to be Solved by the Invention

Meanwhile, where animation display of content can be switched on and off, however, there is a demand for both smooth animation display and higher image quality in non-animation display.

The present technology has been developed in view of those circumstances, and aims to achieve both smooth animation display and higher image quality in non-animation display.

Solutions to Problems

An image processing device according to an aspect of the present technology is an image processing device that includes: a memory unit that stores image data; a reduction scaler unit that reduces the image data of an input image or maintains the current size of the input image, and stores the image data into the memory unit; and an enlargement scaler unit that enlarges the image data stored in the memory unit or maintains the current size of the image, and outputs the image data as the image data of an output image. The reduction scaler unit converts the resolution of the input image to an intermediate resolution in accordance with first parameters related to an image to be supplied from the enlargement scaler unit, the intermediate resolution being a resolution for performing writing on the memory unit. The enlargement scaler unit converts the intermediate resolution of a memory-held image read from the memory unit to the resolution of the output image, in accordance with second parameters related to an image to be supplied from the reduction scaler unit.

The image processing device according to an aspect of the present technology may be an independent device or may be an internal block forming one device. Further, an image processing method or a program according to an aspect of the present technology is an image processing method or a program compatible with the above image processing device according to an aspect of the present technology.

In the image processing device, the image processing method, and the program according to an aspect of the present technology, the reduction scaler unit converts the resolution of an input image to the intermediate resolution that is the resolution for performing writing on the memory unit, in accordance with first parameters related to an image to be supplied from the enlargement scaler unit. The enlargement scaler unit converts the intermediate resolution of a memory-held image read from the memory unit to the resolution of an output image, in accordance with second parameters related to an image to be supplied from the reduction scaler unit.

Effects of the Invention

According to an aspect of the present technology, it is possible to achieve both smooth animation display and higher image quality in non-animation display.

It should be noted that effects of the present technology are not limited to the effects described herein, and may include any of the effects described in the present disclosure.

MODE FOR CARRYING OUT THE INVENTION

The following is a description of an embodiment of the present technology, with reference to the drawings. It should be noted that explanation will be made in the following order.

1. Interlocked operations of scaler units
2. Screen display through the interlocked operations of the scaler units
   (1) Non-animation display operation
   (2) Animation display operation
3. Specific configuration for achieving interlocked operations of the scaler units
4. Flow of a scaling process
5. Configuration of a receiving apparatus
<1. Interlocked Operations of Scaler Units>

Figure 1:
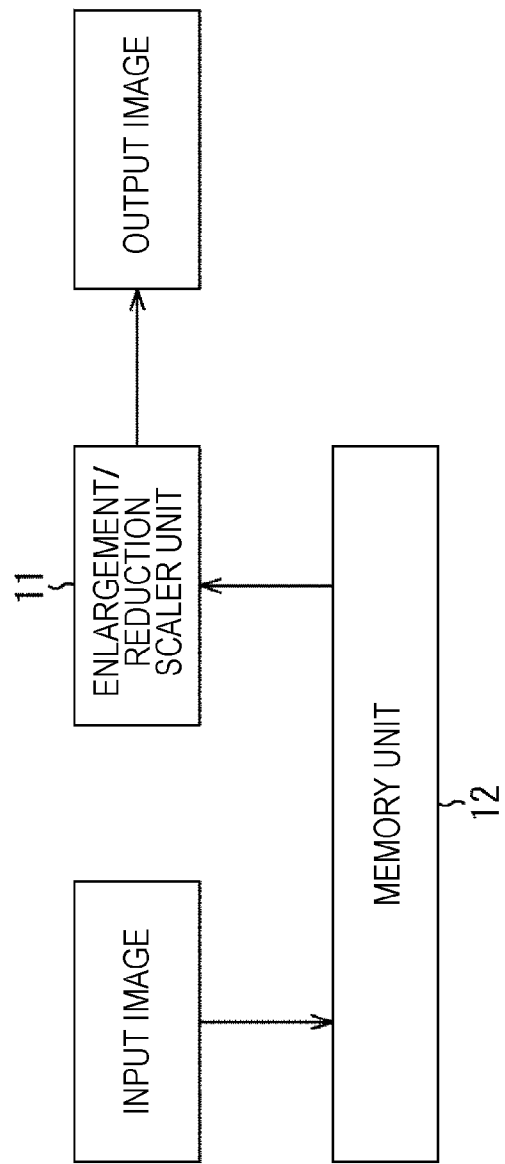
FIG. 1 is a diagram showing a configuration in which an enlargement/reduction scaler unit is disposed on the reading side of a memory unit.

FIG. 1 is a diagram showing the configuration of an image processing device having an enlargement/reduction scaler unit 11 disposed on the reading side of a memory unit 12. Specifically, in FIG. 1, the image data of an input image is written into and stored in the memory unit 12. Therefore, the enlargement/reduction scaler unit 11 reads the image data stored in the memory unit 12, enlarges or reduces the image, and outputs the image as an output image.

Figure 2:
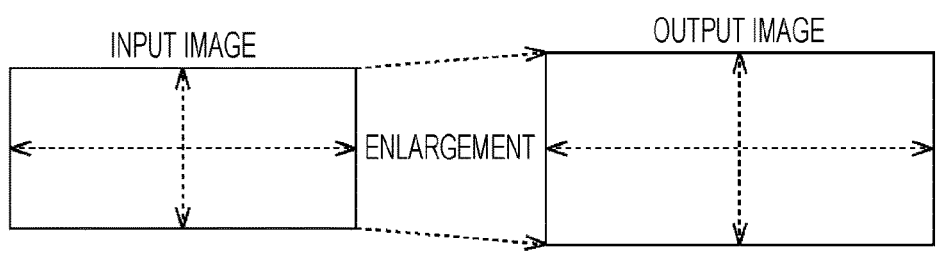
FIG. 2 is a diagram schematically showing an image enlargement process to be performed by the enlargement/reduction scaler unit shown in FIG. 1.
Figure 3:
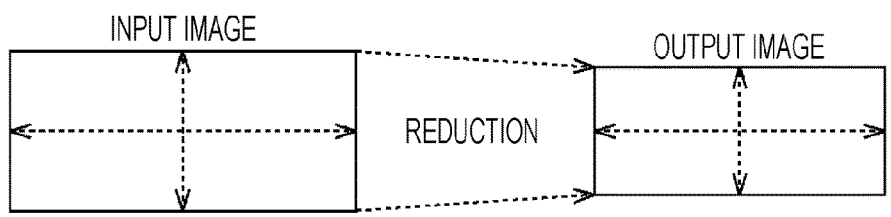
FIG. 3 is a diagram schematically showing an image reduction process to be performed by the enlargement/reduction scaler unit shown in FIG. 1.

It should be noted that FIG. 2 schematically shows a situation where an image enlargement process is performed by the enlargement/reduction scaler unit 11, and an input image is enlarged to an output image. Also, FIG. 3 schematically shows a situation where an image reduction process is performed by the enlargement/reduction scaler unit 11, and an input image is reduced to an output image.

Figure 4:
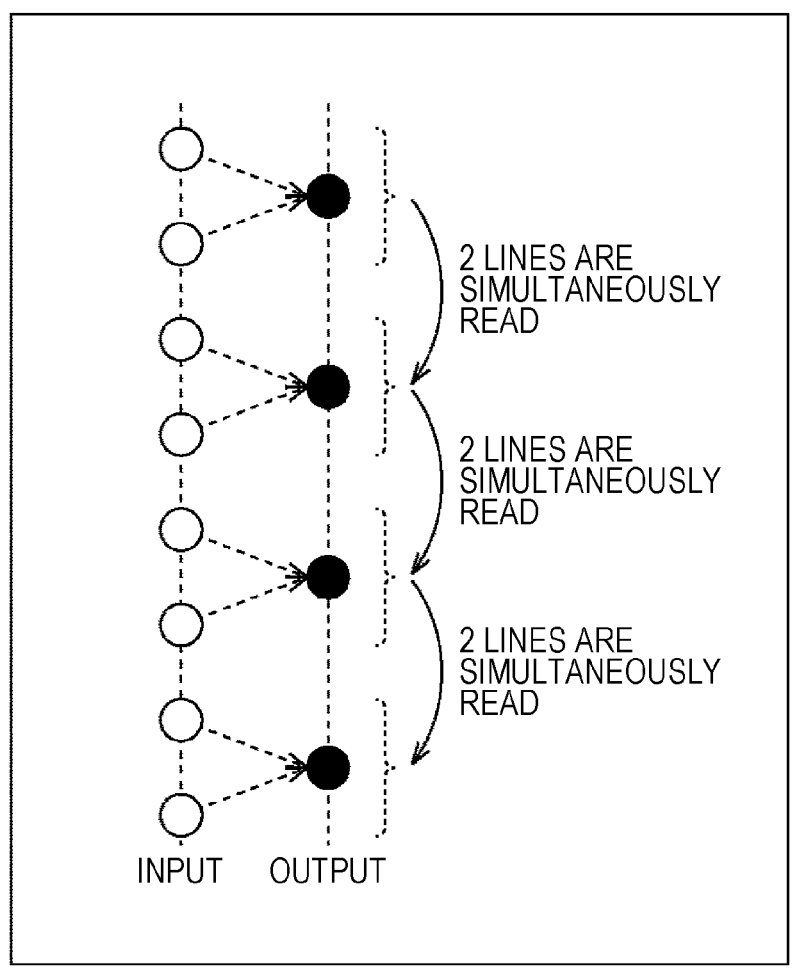
FIG. 4 is a diagram schematically showing the procedures in a vertical reduction process in a case where the configuration shown in FIG. 1 is employed.

In a case where an enlargement or reduction process is performed on a high-quality image of 4K2K (a resolution of approximately 4000×2000) in the image processing device shown in FIG. 1, the problems described below are likely to be caused. That is, in a case where a ½ vertical reduction process is performed, as shown in FIG. 4, two or more lines need to be read at the same time, and therefore, twice or more bandwidth of the memory unit 12 is used. Because of this, the hardware of the memory controller (not shown) that controls the memory unit 12 might become larger in size. Also, where the input/output bitwidth of image data is made greater to increase the bandwidth of the memory unit 12, the number of external memories might become larger.

To counter this, a reduction scaler unit is disposed in the stage before the memory unit, and an enlargement scaler unit is disposed in the stage after the memory unit in an image processing device to which the present technology is applied. In this image processing device, a vertical reduction process is performed prior to writing into the memory unit, to prevent an increase in the bandwidth of the memory unit and an increase in the size of the hardware of the memory controller. Furthermore, in the image processing device to which the present technology is applied, there is no need to increase the input/output bitwidth of image data so as to increase the bandwidth of the memory unit. Thus, an increase in the number of external memories can be prevented.

(Configuration of an Image Processing Device)

Figure 5:
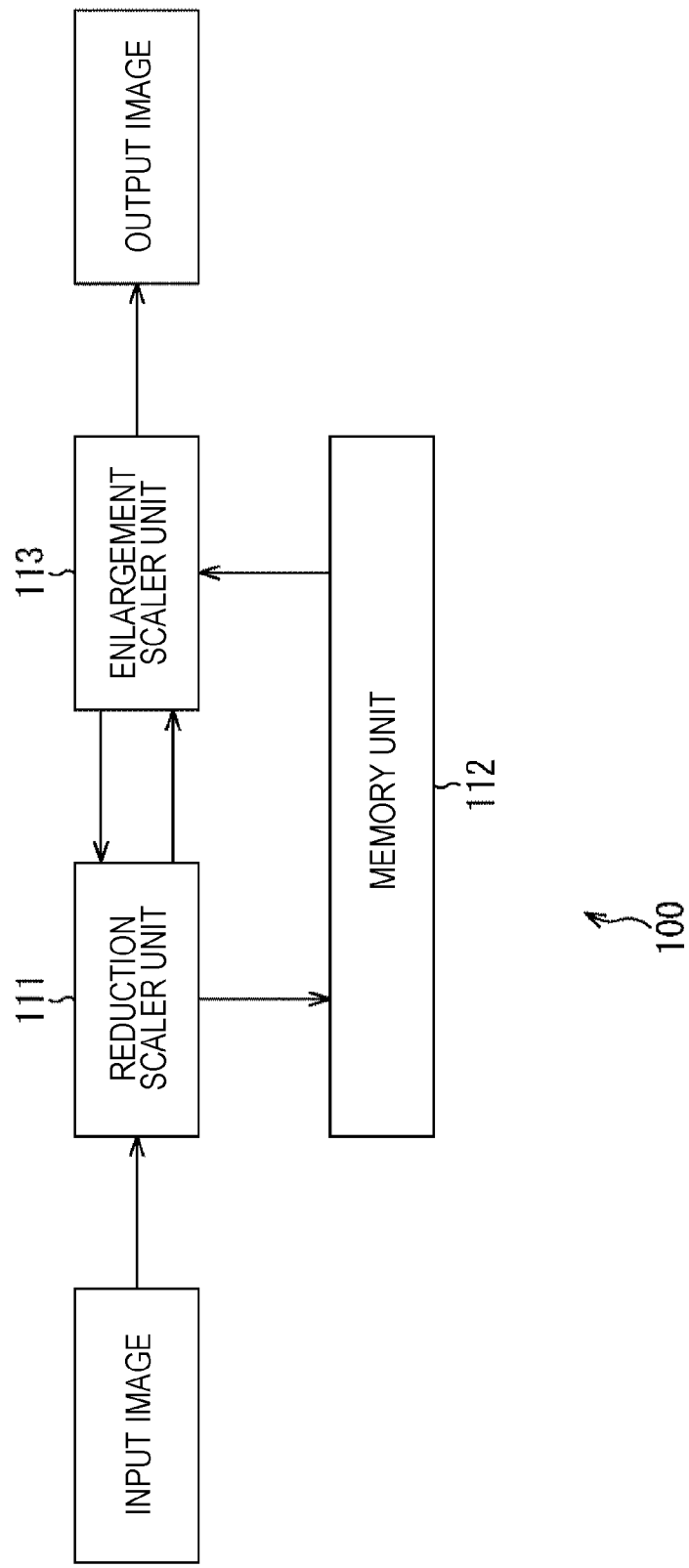
FIG. 5 is a diagram showing the configuration of an embodiment of an image processing device to which the present technology is applied.

FIG. 5 is a diagram showing the configuration of an embodiment of an image processing device to which the present technology is applied.

In FIG. 5, the image processing device 100 includes a reduction scaler unit 111, a memory unit 112, and an enlargement scaler unit 113.

Figure 6:
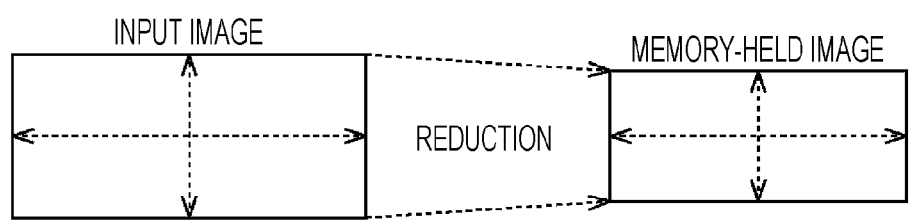
FIG. 6 is a diagram schematically showing an image reduction process to be performed by the reduction scaler unit shown in FIG. 5.

The reduction scaler unit 111 is provided in the stage before the memory unit 112, and performs an image reduction process on the image data of an input image, to reduce the image data of the input image. The reduction scaler unit 111 then writes the image data into the memory unit 112. That is, as shown in FIG. 6, in the image reduction process to be performed by the reduction scaler unit 111, the resolution of the input image is converted into a resolution for performing writing on the memory unit 112 (this resolution will be hereinafter referred to as the "intermediate resolution"), and the writing is performed on the memory unit 112.

As a result, a memory-held image that is an image formed by reducing the input image and has the intermediate resolution, which is lower than the resolution of the input image, is stored in the memory unit 112. It should be noted that the reduction scaler unit 111 may also be able to write the image data of the input image into the memory unit 112, while maintaining the current size of the input image without performing any image reduction process on the image data of the input image.

The memory unit 112 is a volatile memory, such as a dynamic random access memory (DRAM). The memory unit 112 functions as a frame memory that stores the image data of one or more memory-held images on a frame basis.

Figure 7:
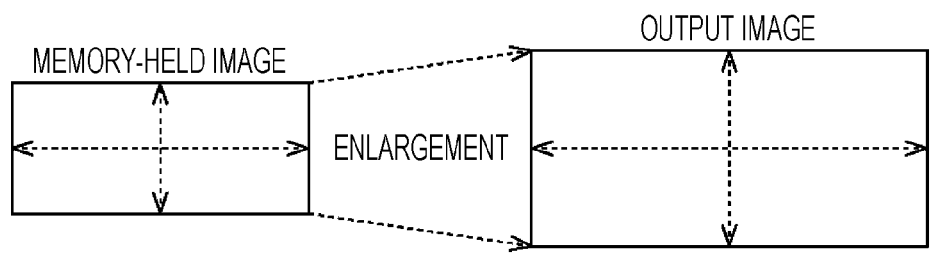
FIG. 7 is a diagram schematically showing an image enlargement process to be performed by the enlargement scaler unit shown in FIG. 5.

The enlargement scaler unit 113 is disposed in the stage after the memory unit 112, and performs an image enlargement process on the image data of a memory-held image read from the memory unit 112, to enlarge the image data of the memory-held image. The enlargement scaler unit 113 then outputs the image data as the image data of an output image to the block in the subsequent stage (the display unit 414 in FIG. 31, for example). That is, as shown in FIG. 7, in the image enlargement process to be performed by the enlargement scaler unit 113, the intermediate resolution of the memory-held image is converted to the resolution of the output image, and the output image is output to the block in the subsequent stage.

As a result, an output image (display image) that is an image formed by enlarging the memory-held image having the intermediate resolution and has a higher resolution than that of the memory-held image is output to the block in the subsequent stage. It should be noted that the enlargement scaler unit 113 may also be able to output the image data of the memory-held image as the image data of the output image, while maintaining the current size of the memory-held image without performing any image enlargement process on the image data of the memory-held image.

Furthermore, in the image processing device 100 shown in FIG. 5, the reduction scaler unit 111 and the enlargement scaler unit 113 operate in conjunction with each other by exchanging parameters for controlling the resolutions of images (these parameters will be hereinafter referred to as the "image parameters"). It should be noted that, in the description below, of these image parameters, the image parameters to be transferred from the enlargement scaler unit 113 to the reduction scaler unit 111 will be referred to as the "first image parameters", and the image parameters to be transferred from the reduction scaler unit 111 to the enlargement scaler unit 113 will be referred to as the "second image parameters".

(Image Parameter Transfers Between the Scaler Units)

Figure 8:
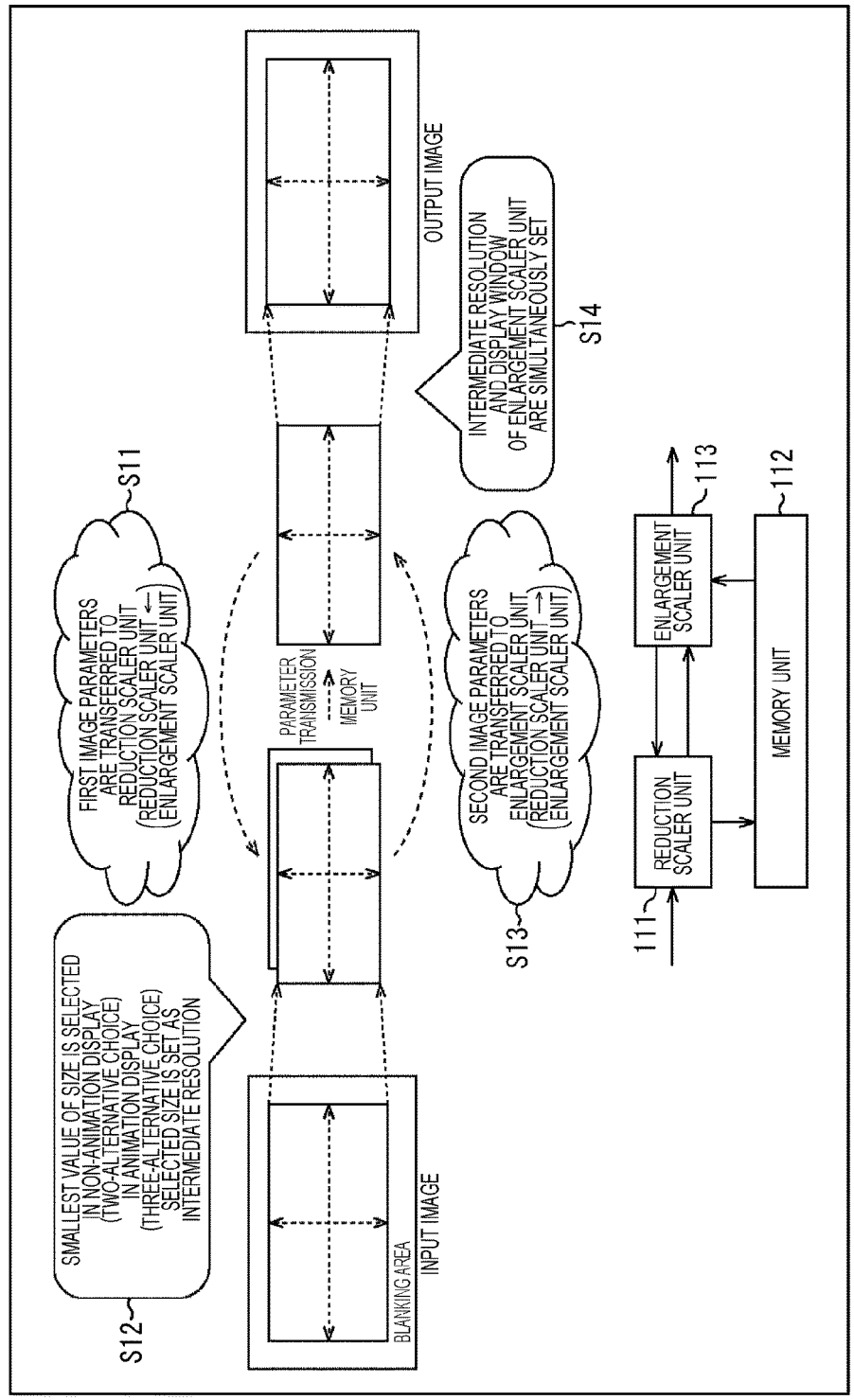
FIG. 8 is a diagram showing the outline of the mechanism of image parameter transfers between the reduction scaler unit and the enlargement scaler unit.

A method of transferring image parameters between the reduction scaler unit 111 and the enlargement scaler unit 113 is now described. FIG. 8 is a diagram showing the outline of the mechanism of image parameter transfers between the reduction scaler unit 111 and the enlargement scaler unit 113.

It should be noted that, in FIG. 8, animation display means displaying content such as a television program while continuously changing the display area of the content at predetermined times. Meanwhile, non-animation display means displaying the display area of content such as a television program in a normal state (one-screen display) without animation display. The image processing device 100 operates in either one of the display modes.

In FIG. 8, the enlargement scaler unit 113 supplies the first image parameters to the reduction scaler unit 111 (S11). These first image parameters include output display parameters and the like related to the output image (display image). In accordance with the first image parameters supplied from the enlargement scaler unit 113 and input image parameters related to the input image, the reduction scaler unit 111 selects the smallest value from among the sizes included in those parameters (S12).

It should be noted that, as will be described later in detail with reference to FIG. 9 and other drawings, a size is selected from three sizes included in the parameters in a case where an operation is being performed in the animation display mode, and a size is selected from two sizes included in the parameters in a case where an operation is being performed in the non-animation display mode. The selected size is then set as the size of the intermediate resolution.

The reduction scaler unit 111 supplies the second image parameters to the enlargement scaler unit 113 (S13). These second image parameters include the size of the intermediate resolution and the output display parameters. In accordance with the second image parameters supplied from the reduction scaler unit 111, the enlargement scaler unit 113 sets the size of the intermediate resolution and the output display parameters.

As described above, in the image processing device 100, the reduction scaler unit 111 and the enlargement scaler unit 113 exchange image parameters and operate in conjunction with each other, to achieve both smooth animation display and higher image quality in non-animation display.

Figure 9:
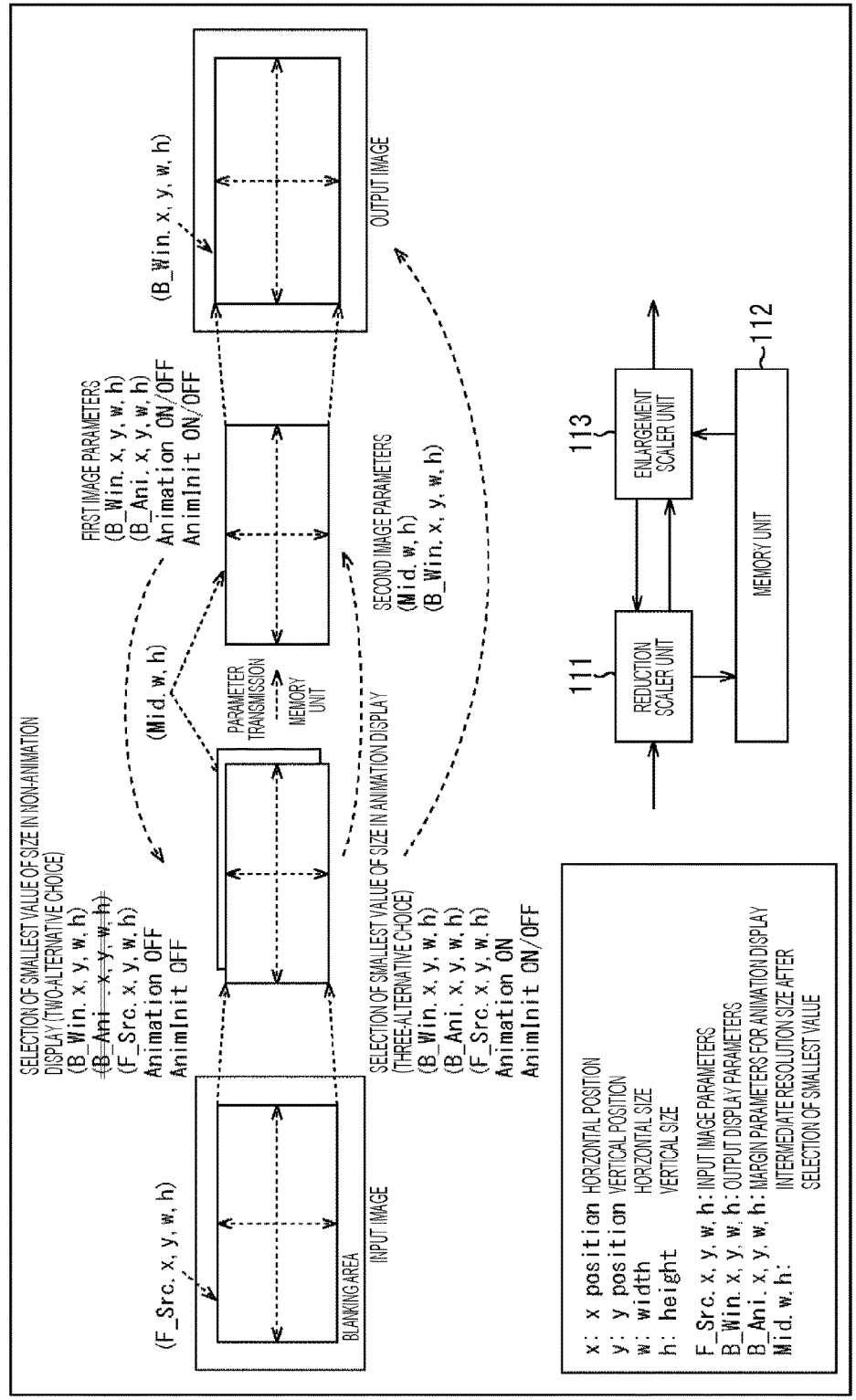
FIG. 9 is a diagram showing the details of the mechanism of image parameter transfers between the reduction scaler unit and the enlargement scaler unit.

More specifically, as shown in FIG. 9, the first image parameters supplied to the reduction scaler unit 111 from the enlargement scaler unit 113 include the output display parameters (B_Win.x, y, w, h), margin parameters for animation display (B_Ani.x, y, w, h), an animation flag (Animation), and an initial flag (AnimInit). Note that among these parameters, x represents a horizontal position, y represents a vertical position, w represents a horizontal size, and h represents a vertical size.

The output display parameters include information indicating the display position and the display size of the output image (display image). The margin parameters are parameters that are set in the animation display mode, and include information indicating the position and the size (margin size) of the area for the margin of the intermediate resolution.

The animation flag is a 1-bit flag indicating the presence or absence of animation display. The animation flag is on (ON) in the animation display mode, and is off (OFF) in the non-animation display mode. The initial flag is a 1-bit flag indicating whether to set the margin size of the intermediate resolution as preprocessing for animation display. The initial flag is on (ON) when a margin size setting process is performed, and is off (OFF) when any other process is performed.

Specifically, in the animation display mode, the first image parameters include the output display parameters, the margin parameters, the animation flag that is on, and the initial flag that is on or off. In the non-animation display mode, on the other hand, the first image parameters include the output display parameters, the animation flag that is off, and the initial flag that is off.

The first image parameters from the enlargement scaler unit 113 are supplied to the reduction scaler unit 111. The reduction scaler unit 111 also acquires the input image parameters (F_Src.x, y, w, h). The input image parameters include information indicating the image position and image size of the input image.

In the animation display mode (the animation flag is on, and the initial flag is on or off), the reduction scaler unit 111 compares the input image parameters, the output display parameters, and the margin parameters, and selects the size of the smallest value among those parameters (three-alternative choice).

Further, in the non-animation display mode (the animation flag is off, and the initial flag is off), the reduction scaler unit 111 compares the input image parameters with the output display parameters, and selects the smaller size (the size of the smallest value) in those parameters (two-alternative choice).

As the size of the smallest value is selected in the animation display mode or the non-animation display mode in the above manner, the reduction scaler unit 111 sets the size of the smallest value as the size of the intermediate resolution (Mid.w, h). The reduction scaler unit 111 also supplies the size of the intermediate resolution and the second image parameters including the output display parameters to the enlargement scaler unit 113.

In the enlargement scaler unit 113, the size of the intermediate resolution as the input size, and the output display parameters (the display size of the output image (display image), for example)) are set in accordance with the second image parameters from the reduction scaler unit 111.

As described above, the reduction scaler unit 111 and the enlargement scaler unit 113 exchange the first image parameters including the output display parameters, the margin parameters, and the like, and the second image parameters including the size of the intermediate resolution and the output display parameters, so that the reduction scaler unit 111 and the enlargement scaler unit 113 operate in conjunction with each other, and both smooth animation display and higher image quality in non-animation display can be achieved.

<2. Screen Display Through the Interlocked Operations of the Scaler Units>

Next, the screen display to be achieved through the above described interlocked operations of the reduction scaler unit 111 and the enlargement scaler unit 113 is described. Here, animation display for displaying a display area while continuously changing the display area, and non-animation display for displaying a display area without any animation display operation are described herein as the screen display.

(Animation Display)

Figure 10:
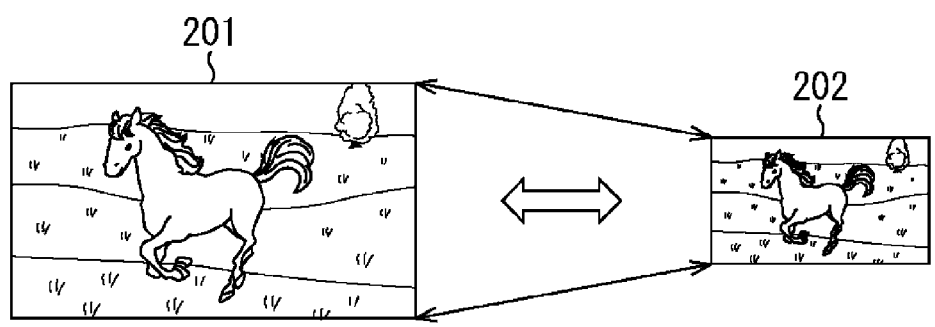
FIG. 10 is a diagram for explaining an animation display operation.

FIG. 10 is a diagram for explaining an animation display operation.

In FIG. 10, the display area of a display image 201 is continuously reduced at predetermined timing by an animation display operation, and the display image 201 is reduced to the display size of a display image 202. Also, the display area of the display image 202 is continuously enlarged at predetermined timing by the animation display operation, and the display image 202 is enlarged to the display size of the display image 201. It should be noted that, in this animation display operation, the display position and the display size of the display image (output image) are updated at the time indicated by a vertical synchronization signal (Vsync) on the output side.

Figure 11:
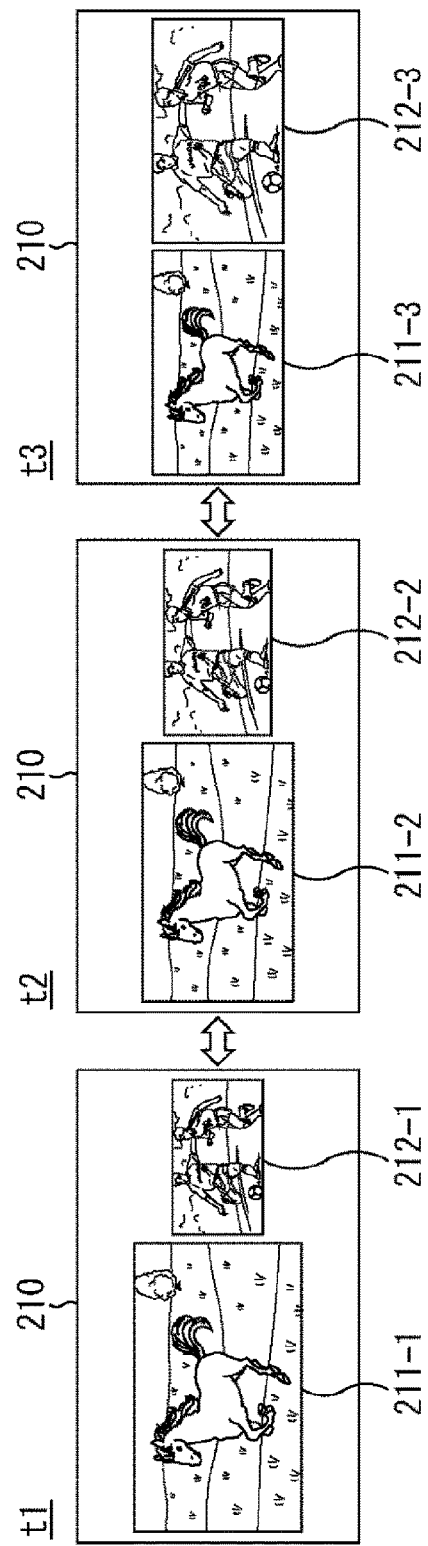
FIG. 11 is a diagram showing an example of animation display in the case of two-screen display.
Figure 12:
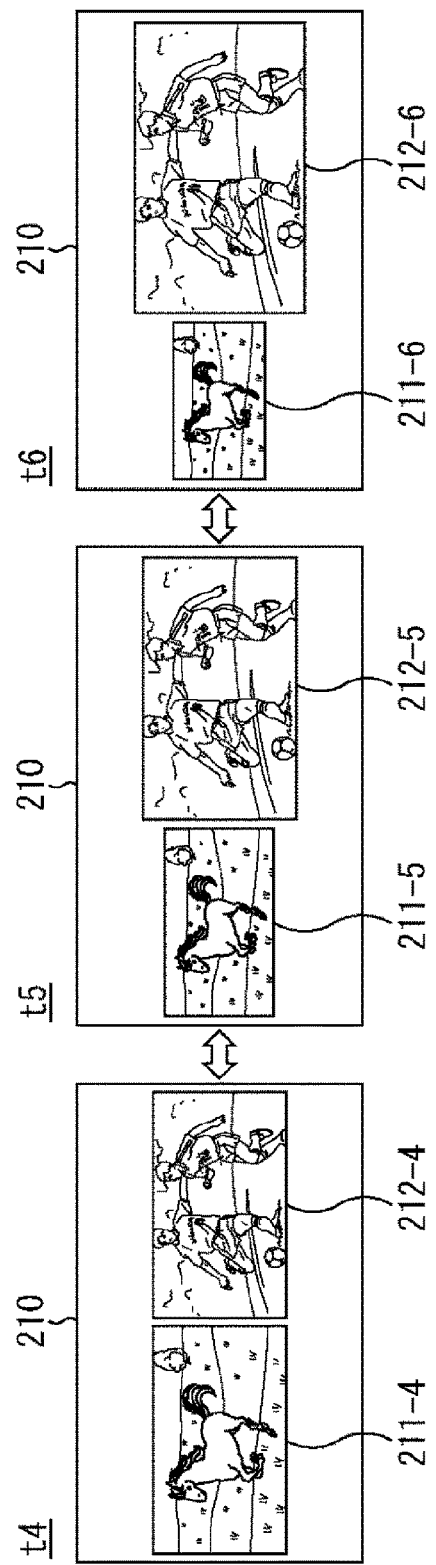
FIG. 12 is a diagram showing an example of animation display in the case of two-screen display.

FIGS. 11 and 12 show example cases where two display images (output images) are displayed as two screens on a screen 210. In FIG. 11, in a case where a display image 211 and a display image 212 are displayed as two screens, and the direction from left to right in the drawing, a display image 211-1 and a display image 212-1 that is smaller than the display image 211-1 are displayed at time t1. At time t2, which is a predetermined time after time t1, a display image 211-2 formed by reducing the display image 211-1, and a display image 212-2 formed by enlarging the display image 212-1 are displayed. At time t3, which is a predetermined time after time t2, a display image 211-3 formed by further reducing the display image 211-1, and a display image 212-3 formed by further enlarging the display image 212-1 are displayed. It should be noted that, at time t3, the display image 211-3 and the display image 212-3 have the same display size.

Of the display images 211 and 212 displayed as two screens, the display image 211 is continuously reduced over time, while the display image 212 is continuously enlarged over time, as described above. In this manner, animation display is performed so that the display image 211 and the display image 212 eventually have the same display size.

It should be noted that, in the example described above, the direction of time is the direction from left to right in the drawing. However, animation display may change in the direction from right to left in the drawing, or in the direction from time t3 to time t2 to time t1. In this case, of the display images 211 and 212 having the same display size, the display image 211 is continuously enlarged over time, while the display image 212 is continuously reduced over time. In this manner, animation display is performed so that the display image 211 eventually becomes larger in size than the display image 212.

Also, in a case where the display image 211 and the display image 212 are displayed as two screens on the screen 210 in FIG. 12, and the direction of time is the direction from left to right in the drawing, a display image 211-4 and a display image 212-4 are displayed in the same display size at time t4. At time t5, which is a predetermined time after time t4, a display image 211-5 formed by reducing the display image 211-4, and a display image 212-5 formed by enlarging the display image 212-4 are displayed. At time t6, which is a predetermined time after time t5, a display image 211-6 formed by further reducing the display image 211-4, and a display image 212-6 formed by further enlarging the display image 212-4 are displayed.

Of the display images 211 and 212 displayed as two screens, the display image 211 is continuously reduced over time, while the display image 212 is continuously enlarged over time, as described above. In this manner, animation display of the display image 211 and the display image 212 having the same display size is performed so that the display image 212 becomes larger in size than the display image 211.

It should be noted that, in the example described above, the direction of time is the direction from left to right in the drawing. However, animation display may change in the direction from right to left in the drawing, or in the direction from time t6 to time t5 to time t4. In this case, of the display image 211 and the display image 212 having a larger size than the display image 211, the display image 211 is continuously enlarged over time, while the display image 212 is continuously reduced over time. In this manner, animation display is performed so that the display image 211 and the display image 212 eventually have the same display size.

Also, the animation display shown in FIG. 11 and the animation display shown in FIG. 12 may be successively performed. Specifically, as times t1 through t6 are on the same time axis, the display image 211 is continuously reduced over time, while the display image 212 is continuously enlarged over time. Consequently, at time t6, the display image 212 has a larger display size than the display image 211, which is the opposite of the situation at time t1.

(1) Non-Animation Display Operation (Transition at the Time of an Image Reduction in Non-Animation Display)

Figure 13:
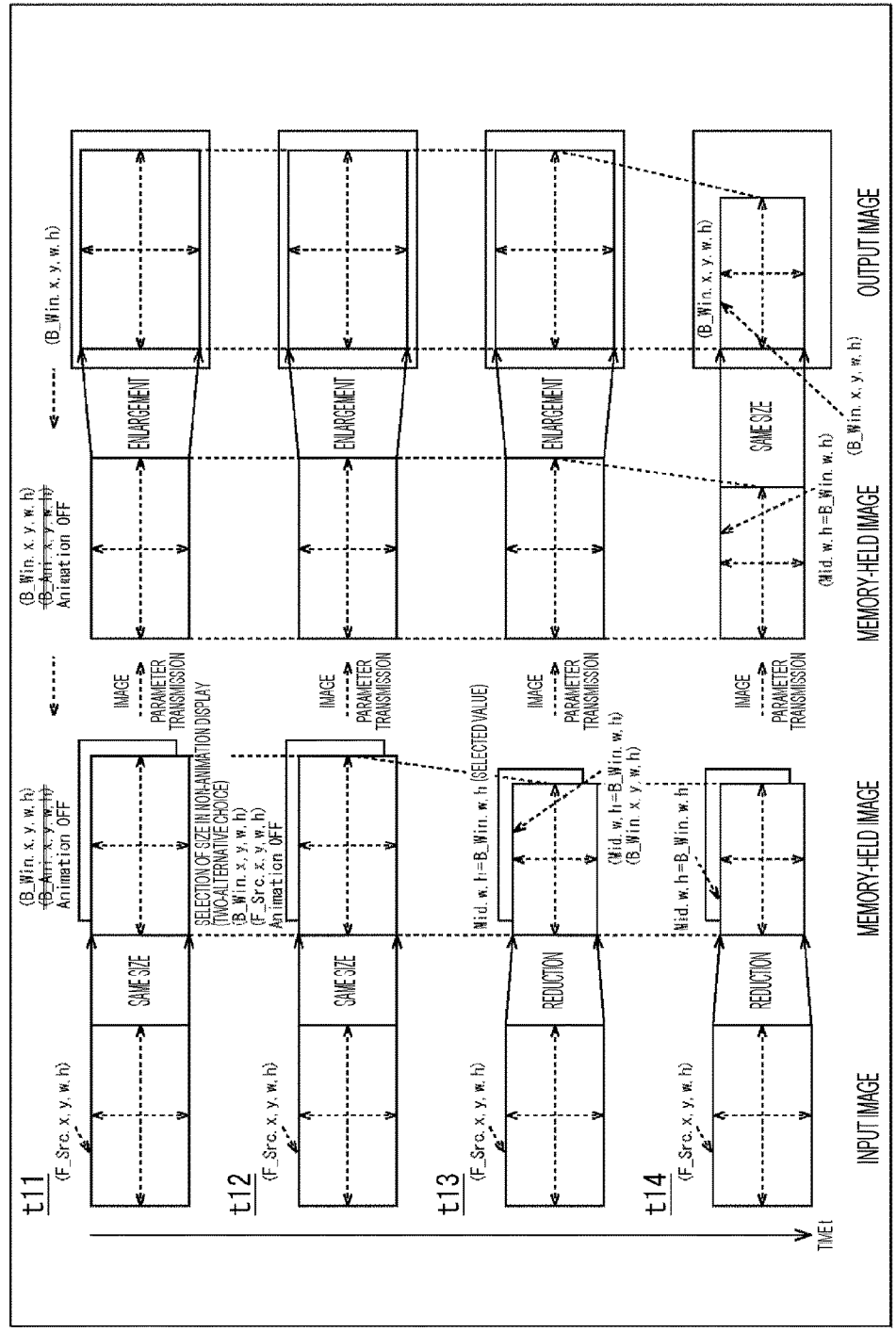
FIG. 13 is a diagram for explaining the transition at the time of an image reduction in non-animation display.

FIG. 13 is a diagram for explaining the transition at the time of an image reduction in non-animation display. In FIG. 13, the image processing device 100 is operating in the non-animation display mode.

It should be noted that, in FIG. 13, the direction of time is the direction from top to bottom in the drawing. Also, in FIG. 13, of the four images at each of the times arranged in chronological order, the two images on the left side represent the image to be processed by the reduction scaler unit 111, or the input image to be input to the reduction scaler unit 111, and the memory-held image to be written into the memory unit 112 by the reduction scaler unit 111. It should be noted that one or more memory-held images are stored in the memory unit 112.

Also, of the four images, the two images on the right side represent the image to be processed by the enlargement scaler unit 113, or the memory-held image to be read from the memory unit 112 and be input to the enlargement scaler unit 113, and the output image (display image) to be output from the enlargement scaler unit 113. It should be noted that, in a case where two or more memory-held images are stored in the memory unit 112, the enlargement scaler unit 113 reads one of the memory-held images. It should be noted that the relationship between these images is similar to those in the other drawings described later.

At time t11, the reduction scaler unit 111 performs writing on the memory unit 112, while maintaining the current size of the input image. The enlargement scaler unit 113 then performs an image enlargement process, reads the memory-held image stored in the memory unit 112, enlarges the size of the memory-held image to the size of the output image, and outputs the output image.

At time t11, the enlargement scaler unit 113 also supplies the first image parameters to the reduction scaler unit 111. These first image parameters include the output display parameters (B_Win.x, y, w, h) and the animation flag (Animation) or the like. On the other hand, the reduction scaler unit 111 acquires the first image parameters from the enlargement scaler unit 113. The reduction scaler unit 111 also acquires the input image parameters (F_Src.x, y, w, h). It should be noted that, in the example shown in FIG. 13, the image processing device 100 is operating in the non-animation display mode, and therefore, the animation flag is off.

At time t12, the reduction scaler unit 111 compares the input image parameters (F_Src.x, y, w, h) with the output display parameters (B_Win.x, y, w, h), and selects the smaller size (the smallest size) from the sizes included in those parameters (two-alternative choice). In this example, the display size in the output display parameters is smaller than the image size in the input image parameters (F_Src.w, h>B_Win.w, h), and therefore, the display size in the output display parameters is selected. It should be noted that, although not described in detail for ease of explanation, the smallest horizontal size and the smallest vertical size are selected independently of each other in practice.

At time t13, the reduction scaler unit 111 sets the size of the intermediate resolution (Mid.w, h), which is the display size (B_Win.w, h) in the output display parameters selected as the smallest size. In this example, the display size in the output display parameters, which is smaller than the image size in the input image parameters, is set as the size of the intermediate resolution. Therefore, the reduction scaler unit 111 performs an image reduction process to reduce the image size of the input image to the size of the intermediate resolution, and writes the reduced input image into the memory unit 112.

It should be noted that, when the reduction scaler unit 111 sets the intermediate resolution, the display size in the output display parameters (B_Win.x, y, w, h) to be returned to the enlargement scaler unit 113 is set in the system for transmitting image parameters from the reduction scaler unit 111 to the enlargement scaler unit 113 (this system will be described later in detail with reference to FIG. 22). The reduction scaler unit 111 supplies the second image parameters to the enlargement scaler unit 113. These second image parameters include the size of the intermediate resolution (B_Win.w, h) and the output display parameters (B_Win.x, y, w, h).

At time t14, the enlargement scaler unit 113 sets the size of the intermediate resolution (B_Win.w, h) and the output display parameters (B_Win.x, y, w, h) of the output image (display image), in accordance with the second image parameters supplied from the reduction scaler unit 111. In this example, the size of the intermediate resolution is the same as the display size of the output image (display image). Therefore, the enlargement scaler unit 113 reads the memory-held image from the memory unit 112, and outputs the memory-held image while maintaining the current size of the memory-held image. As a result, the reduced display image (output image) is displayed.

In the above described transition at the time of an image reduction in non-animation display, when the reduction scaler unit 111 stores an input image into the memory unit 112 without any change in the size of the input image, the enlargement scaler unit 113 enlarges the memory-held image stored in the memory unit 112 and then outputs the enlarged image. When the reduction scaler unit 111 reduces an input image and stores the reduced input image into the memory unit 112, on the other hand, the enlargement scaler unit 113 outputs the memory-held image stored in the memory unit 112 without any change in the size of the memory-held image.

That is, in the non-animation display mode at the time of an image reduction, either the reduction scaler unit 111 or the enlargement scaler unit 113 does not perform any scaling process but outputs an image while maintaining the current size of the image, and only one scaling process that is a reduction process or an enlargement process is performed. Thus, image quality degradation due to repetitive scaling processes can be prevented, and higher image quality can be achieved.

(Transition at the Time of an Image Enlargement in Non-Animation Display)

Figure 14:
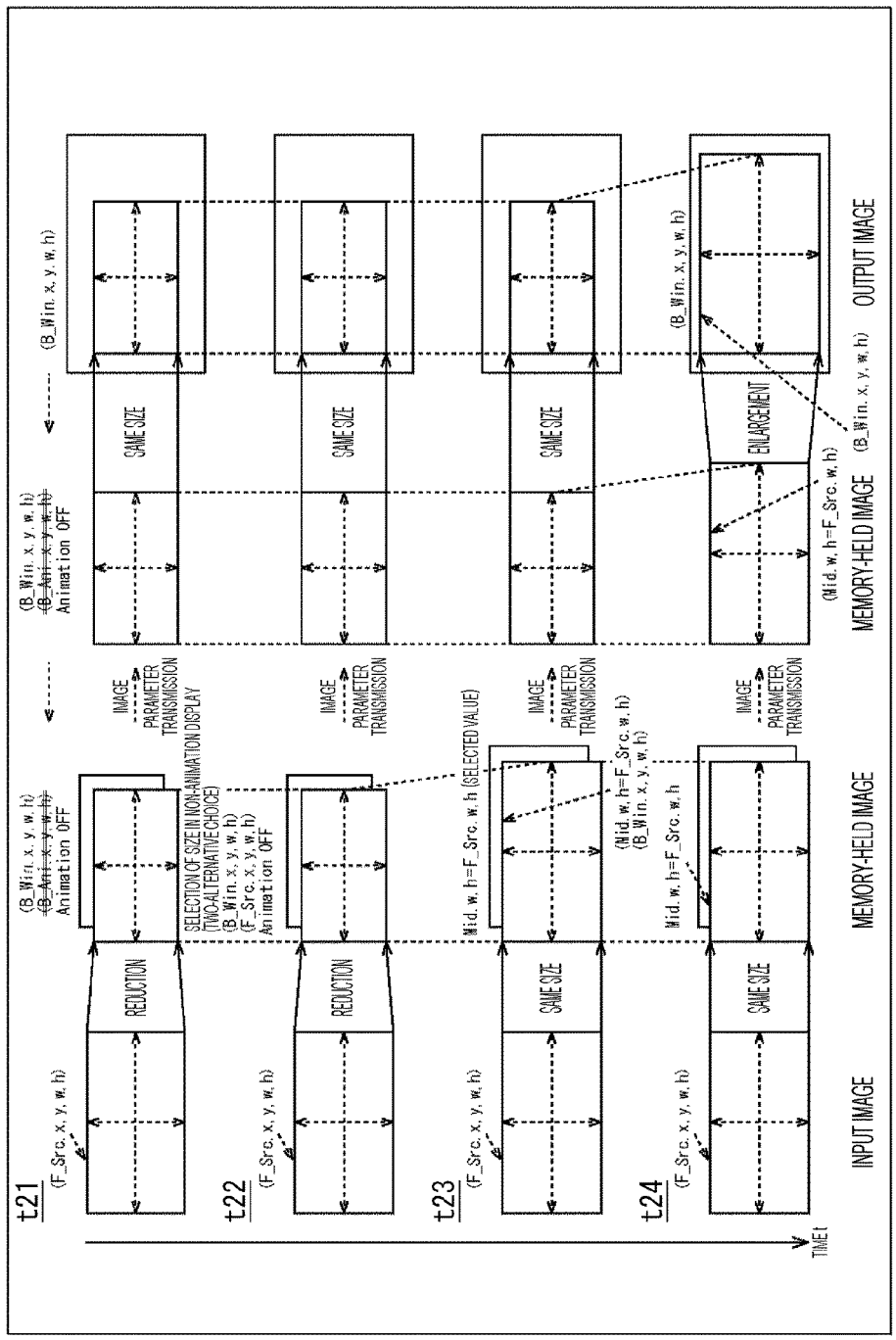
FIG. 14 is a diagram for explaining the transition at the time of an image enlargement in non-animation display.

FIG. 14 is a diagram for explaining the transition at the time of an image enlargement in non-animation display. In FIG. 14, the image processing device 100 is operating in the non-animation display mode.

At time t21, the reduction scaler unit 111 performs an image reduction process to reduce the size of an input image, and writes the reduced input image into the memory unit 112. The enlargement scaler unit 113 then reads the memory-held image stored in the memory unit 112, and outputs the memory-held image as the output image while maintaining the current size of the memory-held image.

At time t21, the enlargement scaler unit 113 also supplies the first image parameters, which include the output display parameters (B_Win.x, y, w, h) and the animation flag (Animation) or the like, to the reduction scaler unit 111. It should be noted that the image processing device 100 is operating in the non-animation display mode in this example, and therefore, the animation flag is off.

At time t22, the reduction scaler unit 111 compares the input image parameters (F_Src.x, y, w, h) with the output display parameters (B_Win.x, y, w, h), and selects the smaller size (the smallest size) from the sizes included in those parameters (two-alternative choice). In this example, the image size in the input image parameters is smaller than the display size in the output display parameters (F_Src.w, h<B_Win.w, h), and therefore, the image size in the input image parameters is selected. It should be noted that the smallest horizontal size and the smallest vertical size are selected independently of each other in this case.

At time t23, the reduction scaler unit 111 sets the size of the intermediate resolution (Mid.w, h), which is the image size (F_Src.w, h) in the input image parameters selected as the smallest size. In this example, the image size in the input image parameters, which is smaller than the display size in the output display parameters, is set as the size of the intermediate resolution. Therefore, the reduction scaler unit 111 writes the input image into the memory unit 112 while maintaining the current size of the input image.

It should be noted that, when the reduction scaler unit 111 sets the intermediate resolution, the display size in the output display parameters (B_Win.x, y, w, h) to be returned to the enlargement scaler unit 113 is set in the image parameter transmission system. The reduction scaler unit 111 supplies the second image parameters to the enlargement scaler unit 113. These second image parameters include the size of the intermediate resolution (F_Src.w, h) and the output display parameters (B_Win.x, y, w, h).

At time t24, the enlargement scaler unit 113 sets the size of the intermediate resolution (F_Src.w, h) and the output display parameters (B_Win.x, y, w, h) of the output image (display image), in accordance with the second image parameters supplied from the reduction scaler unit 111. In this example, the display size of the output image (display image) is larger than the size of the intermediate resolution. Therefore, the enlargement scaler unit 113 performs an image enlargement process to enlarge the memory-held image (having the size of the intermediate resolution) read from the memory unit 112 to the display size of the output image, and then outputs the enlarged output image. As a result, the enlarged display image (output image) is displayed.

In the above described transition at the time of an image enlargement in non-animation display, when the reduction scaler unit 111 reduces an input image and stores the reduced input image into the memory unit 112, the enlargement scaler unit 113 outputs the memory-held image stored in the memory unit 112 without any change in the size of the memory-held image. When the reduction scaler unit 111 stores an input image into the memory unit 112 without any change in the size of the input image, on the other hand, the enlargement scaler unit 113 enlarges the memory-held image stored in the memory unit 112 and then outputs the enlarged memory-held image.

That is, in the non-animation display mode at the time of an image enlargement, either the reduction scaler unit 111 or the enlargement scaler unit 113 does not perform any scaling process but outputs an image while maintaining the current size of the image, and only one scaling process that is a reduction process or an enlargement process is performed. Thus, image quality degradation due to repetitive scaling processes can be prevented, and higher image quality can be achieved.

(2) Animation Display Operation (Transition at the Time of an Image Reduction Transition in Animation Display)

Figure 15:
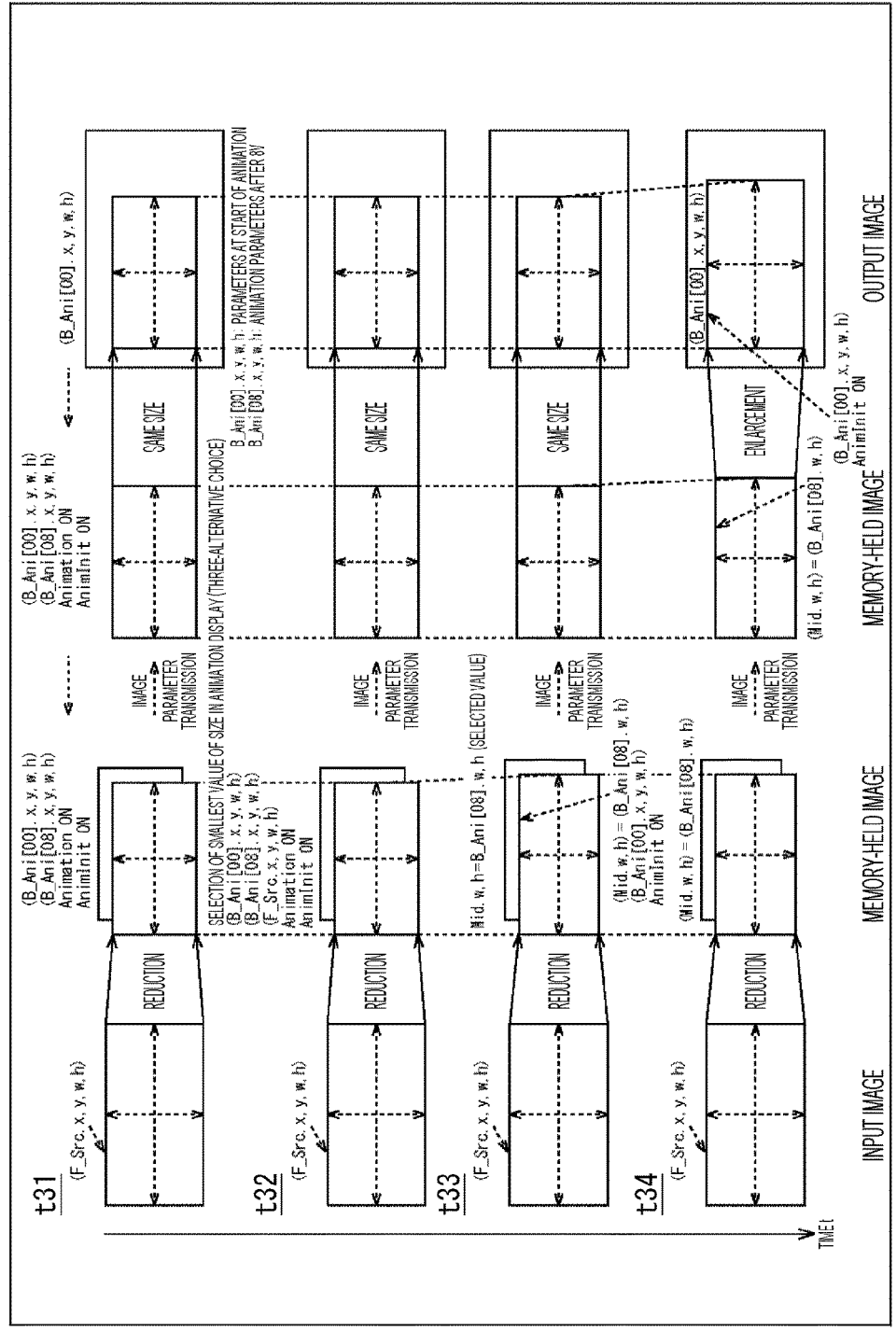
FIG. 15 is a diagram for explaining the transition at the time of an image reduction transition in animation display.
Figure 16:
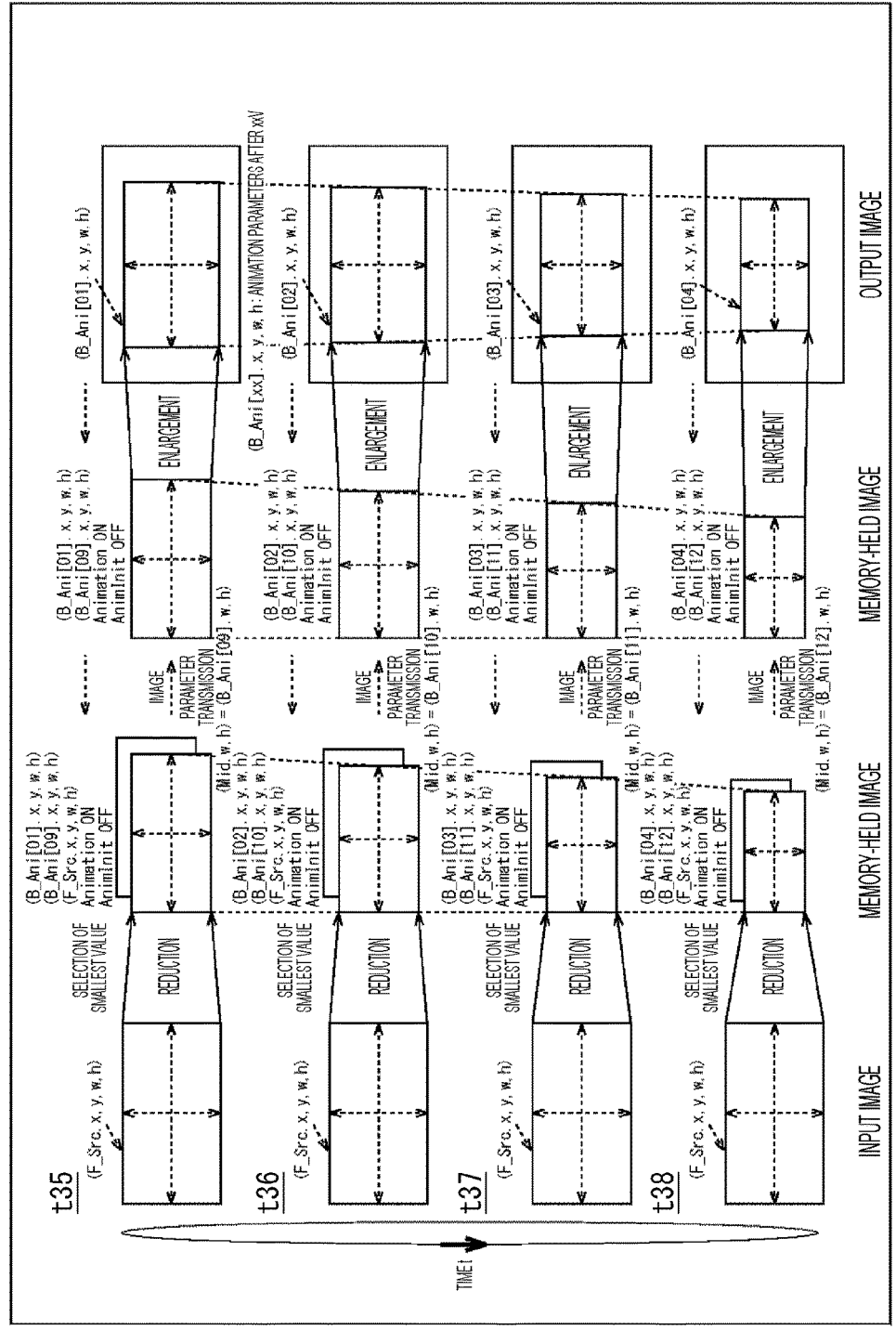
FIG. 16 is a diagram for explaining the transition at the time of an image reduction transition in animation display.
Figure 17:
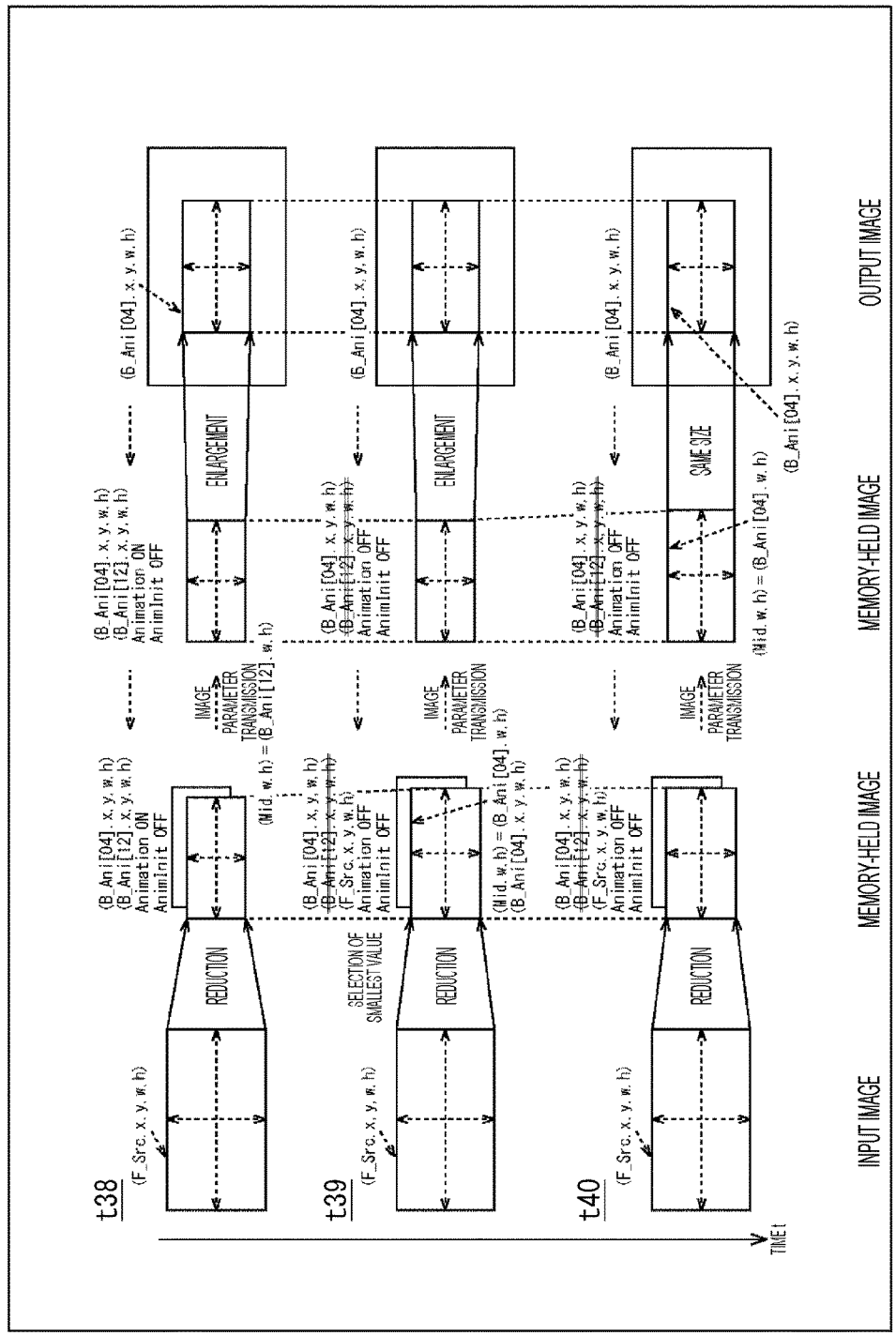
FIG. 17 is a diagram for explaining the transition at the time of an image reduction transition in animation display.

FIGS. 15 through 17 are diagrams for explaining the transition at the time of an image reduction transition in animation display.

It should be noted that, although FIGS. 15 through 17 are separate drawings, the time in these drawings is continuous. Specifically, FIG. 15 shows a margin size setting process as the preprocessing for animation display. FIG. 16 shows an animation display process. FIG. 17 shows a non-animation display process (postprocessing for the animation display). In this example, these processes are to be performed as a series of processes. Therefore, the image processing device 100 operates in the animation display mode in FIGS. 15 and 16, but operates in the non-animation display mode in FIG. 17.

At time t31, the reduction scaler unit 111 performs an image reduction process to reduce the size of an input image, and writes the reduced input image into the memory unit 112. The enlargement scaler unit 113 then reads the memory-held image stored in the memory unit 112, and outputs the memory-held image as the output image without any change in size.

At time t31, the enlargement scaler unit 113 also supplies the first image parameters, which include the output display parameters, the margin parameters, the animation flag, and the initial flag, to the reduction scaler unit 111.

It should be noted that the margin size of the intermediate resolution is set at 8V in this example. Therefore, the first image parameters include the output display parameters (B_Ani[00].x, y, w, h) and the margin parameters (B_Ani[08].x, y, w, h). Here, "B_Ani[00].x, y, w, h" represents the parameters at the start of the animation display, and "B_Ani[08].x, y, w, h" represents the parameters 8V after the start. These relationships are similar to those in the other drawings described later.

Also, since the image processing device 100 is operating in the animation display mode in this example, the animation flag is on. Further, since the margin size setting process is performed as the preprocessing for the animation display in this example, the initial flag is on.

At time t32, the reduction scaler unit 111 compares the input image parameters (F_Src.x, y, w, h), the output display parameters (B_Ani[00].x, y, w, h), and the margin parameters (B_Ani[08].x, y, w, h), and selects the smallest size from the sizes included in those parameters (three-alternative choice). Since the size in the margin parameters after 8V (the margin size) is the smallest in this example (B_Ani[08].w, h<B_Ani[00].w, h<F_Src.w, h), the margin size after 8V is selected. It should be noted that the smallest horizontal size and the smallest vertical size are selected independently of each other in this case.

At time t33, the reduction scaler unit 111 sets the size of the intermediate resolution (Mid.w, h), which is the margin size (B_Ani[08].w, h) after 8V selected as the smallest size. In this example, the margin size after 8V, which is smaller than the image size in the input image parameters, is set as the size of the intermediate resolution. Therefore, the reduction scaler unit 111 performs an image reduction process to reduce the image size of the input image to the size of the intermediate resolution, and writes the reduced input image into the memory unit 112.

It should be noted that, when the reduction scaler unit 111 sets the intermediate resolution, the output display parameters (B_Ani[00].x, y, w, h) to be returned to the enlargement scaler unit 113 are set in the image parameter transmission system. The reduction scaler unit 111 supplies the second image parameters to the enlargement scaler unit 113. These second image parameters include the size of the intermediate resolution (B_Ani[08].w, h) and the output display parameters (B_Ani[00].x, y, w, h).

At time t34, the enlargement scaler unit 113 sets the size of the intermediate resolution (B_Ani[08].w, h) and the output display parameters (B_Ani[00].x, y, w, h) of the output image (display image), in accordance with the second image parameters supplied from the reduction scaler unit 111. In this example, the display size of the output image is larger than the size of the intermediate resolution. Therefore, the enlargement scaler unit 113 performs an image enlargement process to enlarge the memory-held image (having the size of the intermediate resolution) read from the memory unit 112 to the display size of the output image, and then outputs the enlarged output image.

As the margin size setting process shown in FIG. 15 is performed as above, the margin size after 8V is set as the size of the intermediate resolution, and accordingly, a sufficient margin size is achieved. Thus, the preparation for the start of an animation display process is completed. Then, after the preparation for the start of an animation display process is completed, the animation display process shown in FIG. 16 is started.

In the animation display process shown in FIG. 16, during the period from the starting time till the ending time of the animation display, an image reduction process by the reduction scaler unit 111 and an image enlargement process by the enlargement scaler unit 113 from time t35 till time t38 are repeated to achieve animation display in which the size of the output image (display image) is continuously reduced over time.

Further, in the animation display process shown in FIG. 16, the image parameters to be exchanged between the reduction scaler unit 111 and the enlargement scaler unit 113 are as follows. That is, the enlargement scaler unit 113 supplies the first image parameters, which are the output display parameters, the margin parameters, the animation flag, and the initial flag, to the reduction scaler unit 111, while the reduction scaler unit 111 supplies the second image parameters, which are the size of the intermediate resolution and the output display parameters.

Specifically, at time t35, the first image parameters include the output display parameters (B_Ani[01].x, y, w, h) and the margin parameters (B_Ani[09].x, y, w, h), since 8V is set as the margin size. Also, since the image processing device 100 is operating in the animation display mode, the animation flag is on. Further, since the margin size setting process has been completed as the preprocessing for the animation display, the initial flag is off.

The reduction scaler unit 111 compares the input image parameters (F_Src.x, y, w, h), the output display parameters (B_Ani[01].x, y, w, h), and the margin parameters (B_Ani[09].x, y, w, h), and selects the margin size after 9V (B_Ani[09].w, h) as the smallest size among the sizes included in those parameters (three-alternative choice). Thus, the margin size after 9V (B_Ani[09].w, h) is set as the size of the intermediate resolution (Mid.w, h). Also, the second image parameters including this intermediate resolution size and the output display parameters are supplied to the enlargement scaler unit 113, and are set therein.

At time t36, the first image parameters include the output display parameters (B_Ani[02].x, y, w, h) and the margin parameters (B_Ani[10].x, y, w, h).

The reduction scaler unit 111 compares the input image parameters (F_Src.x, y, w, h), the output display parameters (B_Ani[02].x, y, w, h), and the margin parameters (B_Ani[10].x, y, w, h), and selects the margin size after 10V (B_Ani[10].w, h) as the smallest size among the sizes included in those parameters (three-alternative choice). Thus, the margin size after 10V (B_Ani[10].w, h) is set as the size of the intermediate resolution (Mid.w, h). Also, the second image parameters including this intermediate resolution size and the output display parameters are supplied to the enlargement scaler unit 113, and are set therein.

At time t37, the first image parameters include the output display parameters (B_Ani [03].x, y, w, h) and the margin parameters (B_Ani [11].x, y, w, h).

The reduction scaler unit 111 compares the input image parameters (F_Src.x, y, w, h), the output display parameters (B_Ani[03].x, y, w, h), and the margin parameters (B_Ani[11].x, y, w, h), and selects the margin size after 11V (B_Ani[11].w, h) as the smallest size among the sizes included in those parameters (three-alternative choice). Thus, the margin size after 11V (B_Ani[11].w, h) is set as the size of the intermediate resolution (Mid.w, h). Also, the second image parameters including this intermediate reso-lution size and the output display parameters are supplied to the enlargement scaler unit 113, and are set therein.

At time t38, the first image parameters include the output display parameters (B_Ani [04].x, y, w, h) and the margin parameters (B_Ani [12].x, y, w, h).

The reduction scaler unit 111 compares the input image parameters (F_Src.x, y, w, h), the output display parameters (B_Ani[04].x, y, w, h), and the margin parameters (B_Ani [12].x, y, w, h), and selects the margin size after 12V (B_Ani[12].w, h) as the smallest size among the sizes included in those parameters (three-alternative choice). Thus, the margin size after 12V (B_Ani[12].w, h) is set as the size of the intermediate resolution (Mid.w, h). Also, the second image parameters including this intermediate resolution size and the output display parameters are supplied to the enlargement scaler unit 113, and are set therein.

As described above, in the animation display process shown in FIG. 16, a size with a margin size is set as the intermediate resolution, as a sufficient margin size obtained in the margin size setting process shown in FIG. 15 is used. Thus, the enlargement scaler unit 113 can smoothly update the display size of the output image (display image), and achieve smooth animation display. That is, in the animation display process shown in FIG. 16, the reduction scaler unit 111 in the stage before the memory unit 112 maintains an output size not larger than the size of the input image, while the enlargement scaler unit 113 maintains an output size not smaller than the size of the memory-held image.

Further, the reason for setting a margin size for the intermediate resolution during animation display is to cope with a possible situation where the input image and the output image have different frame frequencies. Although the input and output frame frequencies are assumed to be the same in each of the drawings, the input and output frame frequencies are normally different in two-screen display or the like. In a case where the input and output frame frequencies are different, the timing for the reduction scaler unit 111 to set the intermediate resolution differs from the timing for the enlargement scaler unit 113 to set the output display size. In view of this, the size of the intermediate resolution is allowed to have a margin, and the enlargement scaler unit 113 is controlled to maintain a size-unchanged state or an enlarged state.

In this example, after the animation display shown in FIG. 16 ends, the non-animation display process shown in FIG. 17 (postprocessing for the animation display) is performed. It should be noted that, in this example, time t38 in FIG. 16 (FIG. 17) is the ending time of the animation display, and time t39 in FIG. 17 is the starting time of the non-animation display.

Specifically, at time t39, the enlargement scaler unit 113 supplies the first image parameters, which include the output display parameters (B_Ani[04].x, y, w, h), the animation flag, and the initial flag, to the reduction scaler unit 111. It should be noted that the image processing device 100 is operating in the non-animation display mode in this example, and therefore, the animation flag and the initial flag are off.

The reduction scaler unit 111 compares the input image parameters (F_Src.x, y, w, h) with the output display parameters (B_Ani[04].x, y, w, h), and selects the parameters of the smaller size (the smallest size) from the sizes included in those parameters (two-alternative choice). In this example, the output size in the output display parameters is smaller than the image size in the input image parameters, and therefore, the output size (B_Ani[04].w, h) in the output display parameters is selected (two-alternative choice) and is set as the size of the intermediate resolution (Mid.w, h).

Also, when the reduction scaler unit 111 sets the intermediate resolution, the display size in the output display parameters to be returned to the enlargement scaler unit 113 is set in the image parameter transmission system. The reduction scaler unit 111 supplies the second image parameters to the enlargement scaler unit 113. These second image parameters include the size of the intermediate resolution (B_Ani[04].w, h) and the output display parameters (B_Ani [04].x, y, w, h).

At time t40, the enlargement scaler unit 113 sets the size of the intermediate resolution (B_Ani[04].w, h) and the output display parameters (B_Ani[04].x, y, w, h) of the output image (display image), in accordance with the second image parameters supplied from the reduction scaler unit 111. In this example, the size of the intermediate resolution is the same as the display size of the output image (display image). Therefore, the enlargement scaler unit 113 reads the memory-held image from the memory unit 112, and outputs the memory-held image while maintaining the current size of the memory-held image. As a result, the operation mode switches from the animation display mode to the non-animation display mode in the image processing device 100.

As described above, in the transition at the time of an image reduction transition in animation display, a sufficient margin size obtained in the margin size setting process performed as preprocessing for the animation display is used, so that a size with a margin size is set as the intermediate resolution. Accordingly, the display size of the output image (display image) can be smoothly updated (reduced) even when the input and output frame frequencies are different. Thus, smooth animation display can be achieved.

(Transition at the Time of an Image Enlargement Transition in Animation Display)

Figure 18:
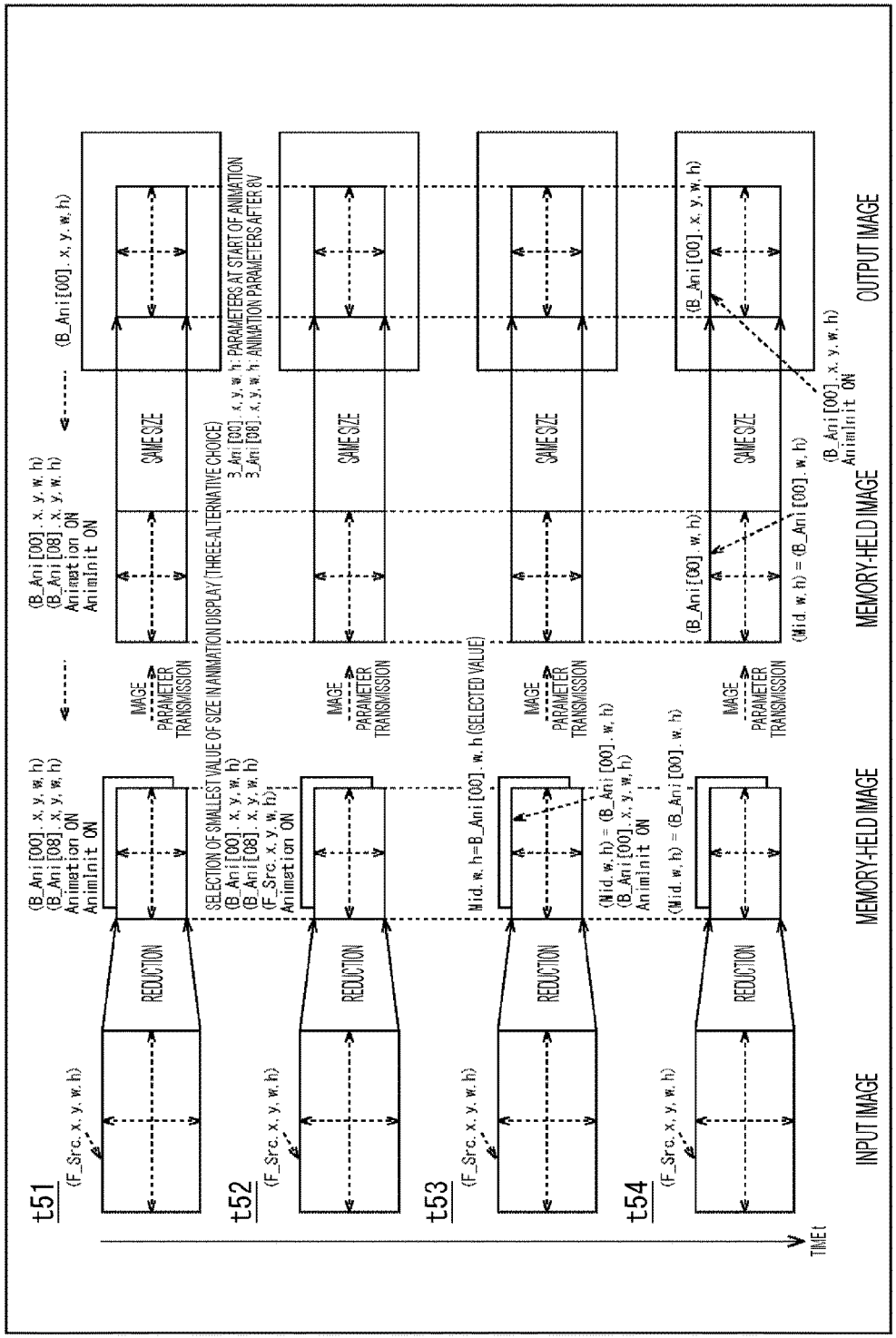
FIG. 18 is a diagram for explaining the transition at the time of an image enlargement transition in animation display.
Figure 19:
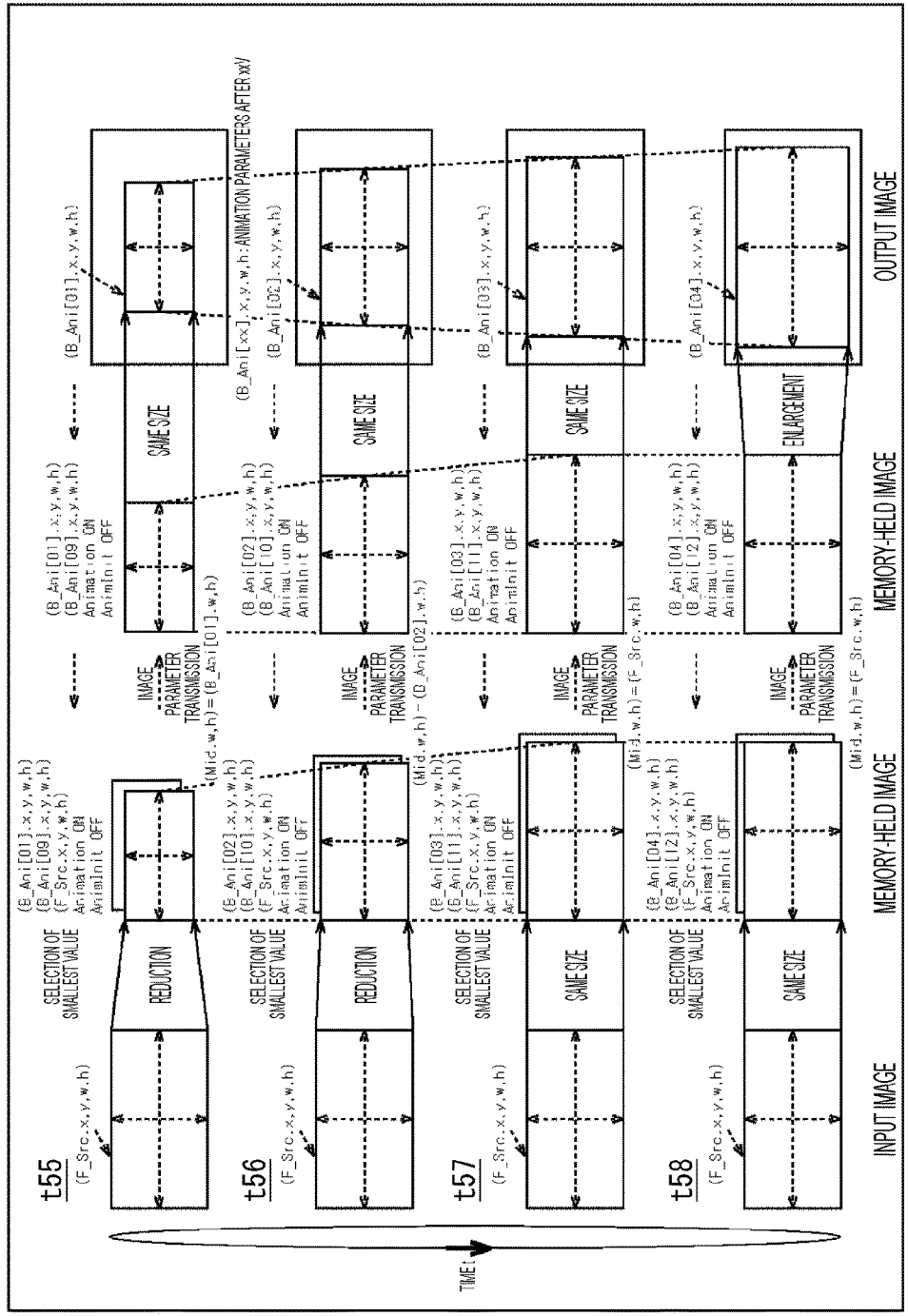
FIG. 19 is a diagram for explaining the transition at the time of an image enlargement transition in animation display.
Figure 20:
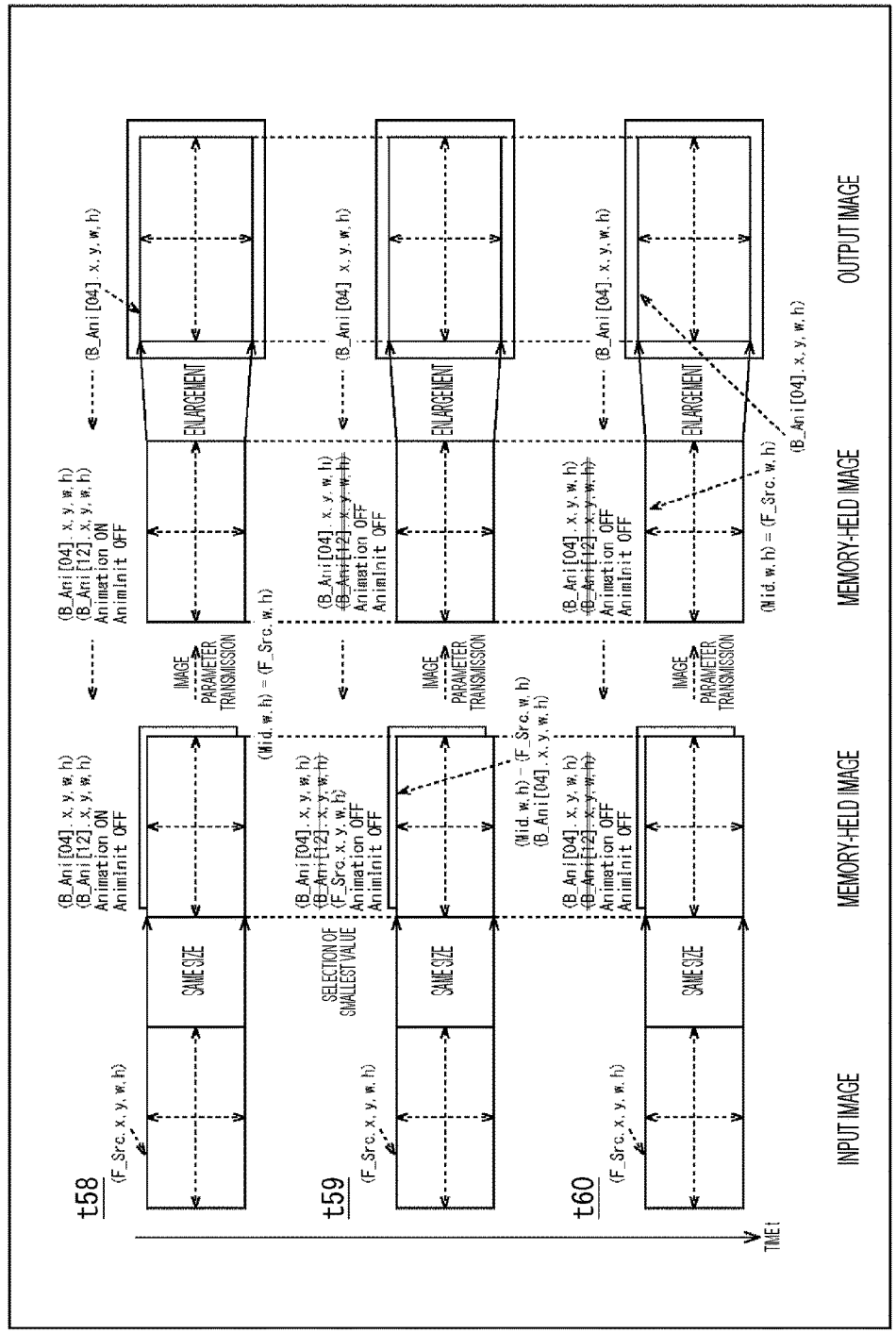
FIG. 20 is a diagram for explaining the transition at the time of an image enlargement transition in animation display.

FIGS. 18 through 20 are diagrams for explaining the transition at the time of an image enlargement transition in animation display.

It should be noted that, like FIGS. 15 through 17 described above, FIGS. 18 through 20 illustrate the following processes. FIG. 18 shows a margin size setting process, FIG. 19 shows an animation display process, and FIG. 20 shows a non-animation display process (postprocessing for the animation display). In this example, these processes are to be performed as a series of processes. Therefore, the image processing device 100 operates in the animation display mode in FIGS. 18 and 19, but operates in the non-animation display mode in FIG. 20.

At time t51, the reduction scaler unit 111 performs an image reduction process to reduce the size of an input image, and writes the reduced input image into the memory unit 112. The enlargement scaler unit 113 then reads the memory-held image stored in the memory unit 112, and outputs the memory-held image as the output image without any change in size.

At time t51, the enlargement scaler unit 113 also supplies the first image parameters, which include the output display parameters, the margin parameters, the animation flag, and the initial flag, to the reduction scaler unit 111.

It should be noted that the margin size of the intermediate resolution is set at 8V in this example. Therefore, the first image parameters include the output display parameters (B_Ani[00].x, y, w, h) and the margin parameters (B_Ani [08].x, y, w, h). Further, the animation flag and the initial flag are both on.

At time t52, the reduction scaler unit 111 compares the input image parameters (F_Src.x, y, w, h), the output display parameters (B_Ani[00].x, y, w, h), and the margin parameters (B_Ani[08].x, y, w, h), and selects the smallest size from the sizes included in those parameters (three-alternative choice). Since the output size in the output display parameters is the smallest in this example (B_Ani[00].w, h<B_Ani[08].w, h<F_Src.w, h), the output size in the output display parameters is selected. It should be noted that the smallest horizontal size and the smallest vertical size are selected independently of each other in this case.

At time t53, the reduction scaler unit 111 sets the size of the intermediate resolution (Mid.w, h), which is the output size (B_Ani[00].w, h) in the output display parameters selected as the smallest size. In this example, the output size (B_Ani[00].w, h) in the output display parameters, which are smaller than the input image parameters, is set as the size of the intermediate resolution. Therefore, the reduction scaler unit 111 performs an image reduction process to reduce the image size of the input image to the size of the intermediate resolution, and writes the reduced input image into the memory unit 112.

It should be noted that, when the reduction scaler unit 111 sets the intermediate resolution, the output display parameters (B_Ani[00].x, y, w, h) to be returned to the enlargement scaler unit 113 are set in the image parameter transmission system. The reduction scaler unit 111 supplies the second image parameters to the enlargement scaler unit 113. These second image parameters include the size of the intermediate resolution (B_Ani[00].w, h) and the output display parameters (B_Ani[00].x, y, w, h).

At time t54, the enlargement scaler unit 113 sets the size of the intermediate resolution (B_Ani[00].w, h) and the output display parameters (B_Ani[00].x, y, w, h) of the output image (display image), in accordance with the second image parameters supplied from the reduction scaler unit 111. In this example, the display size of the output image is the same as the size of the intermediate resolution. Therefore, the enlargement scaler unit 113 reads the memory-held image stored in the memory unit 112, and outputs the memory-held image as the output image while maintaining the current size of the memory-held image.

As the margin size setting process shown in FIG. 18 is performed as above, the margin size after 8V is set as the size of the intermediate resolution, and accordingly, a sufficient margin size is achieved. Thus, the preparation for the start of an animation display process is completed. Then, after the preparation for the start of an animation display process is completed, the animation display process shown in FIG. 19 is started.

In the animation display process shown in FIG. 19, at time t55 and time t56, the memory-held image that has been reduced in the image reduction process performed by the reduction scaler unit 111 and is stored in the memory unit 112 is output by the enlargement scaler unit 113 without any change in the size of the memory-held image. Further, at time t57, neither the image reduction process by the reduction scaler unit 111 nor the image enlargement process by the enlargement scaler unit 113 is performed. That is, in this state, the input image that is input to the reduction scaler unit 111 is output as the output image (display image) from the enlargement scaler unit 113, without any change in the size of the input image.

Then, after the input image and the output image (display image) become equal to each other in size, at time t58, the reduction scaler unit 111 stores the input image into the memory unit 112 without any change in the size of the input image, and the enlargement scaler unit 113 enlarges the memory-held image stored in the memory unit 112, and outputs the enlarged memory-held image as the output image (display image). In this manner, animation display in which the output image (display image) is continuously enlarged over time is achieved.

It should be noted that, thereafter, the process performed by the reduction scaler unit 111 to store the input image into the memory unit 112 without any change in the size of the input image, and the image enlargement process performed by the enlargement scaler unit 113 to enlarge the memory-held image are repeated, as in the process at time t58. In this manner, animation display in which the output image (display image) is continuously enlarged over time is achieved.

Further, in the animation display process shown in FIG. 19, the image parameters to be exchanged between the reduction scaler unit 111 and the enlargement scaler unit 113 are as follows. That is, the enlargement scaler unit 113 supplies the first image parameters, which are the output display parameters, the margin parameters, the animation flag, and the initial flag, to the reduction scaler unit 111, while the reduction scaler unit 111 supplies the second image parameters, which are the size of the intermediate resolution and the output display parameters.

Specifically, at time t55, the first image parameters include the output display parameters (B_Ani[01].x, y, w, h) and the margin parameters (B_Ani[09].x, y, w, h), since 8V is set as the margin size. Further, although the animation flag is on, the initial flag is off, because the margin size setting process has been completed at this stage.

The reduction scaler unit 111 compares the input image parameters (F_Src.x, y, w, h), the output display parameters (B_Ani[01].x, y, w, h), and the margin parameters (B_Ani [09].x, y, w, h), and selects the display size (B_Ani[01].w, h) in the output display parameters as the smallest size among the sizes included in those parameters (three-alternative choice). Thus, the display size (B_Ani[01].w, h) is set as the size of the intermediate resolution (Mid.w, h). Also, the second image parameters including this intermediate resolution size and the output display parameters are supplied to the enlargement scaler unit 113, and are set therein.

At time t56, the first image parameters include the output display parameters (B_Ani[02].x, y, w, h) and the margin parameters (B_Ani[10].x, y, w, h).

The reduction scaler unit 111 compares the input image parameters (F_Src.x, y, w, h), the output display parameters (B_Ani[02].x, y, w, h), and the margin parameters (B_Ani [10].x, y, w, h), and selects the display size (B_Ani[02].w, h) in the output display parameters as the smallest size among the sizes included in those parameters (three-alternative choice). Thus, the display size (B_Ani[02].w, h) is set as the size of the intermediate resolution (Mid.w, h). Also, the second image parameters including this intermediate resolution size and the output display parameters are supplied to the enlargement scaler unit 113, and are set therein.

At time t57, the first image parameters include the output display parameters (B_Ani [03].x, y, w, h) and the margin parameters (B_Ani [11].x, y, w, h).

The reduction scaler unit 111 compares the input image parameters (F_Src.x, y, w, h), the output display parameters (B_Ani[03].x, y, w, h), and the margin parameters (B_Ani [11].x, y, w, h), and selects the image size (F_Src.w, h) in the input image parameters as the smallest size among the sizes included in those parameters (three-alternative choice). Thus, the image size (F_Src.w, h) is set as the size of the intermediate resolution (Mid.w, h). Also, the second image parameters including this intermediate resolution size and the output display parameters are supplied to the enlargement scaler unit 113, and are set therein.

At time t58, the first image parameters include the output display parameters (B_Ani [04].x, y, w, h) and the margin parameters (B_Ani [12].x, y, w, h).

The reduction scaler unit 111 compares the input image parameters (F_Src.x, y, w, h), the output display parameters (B_Ani[04].x, y, w, h), and the margin parameters (B_Ani [12].x, y, w, h), and selects the image size (F_Src.w, h) in the input image parameters as the smallest size among the sizes included in those parameters (three-alternative choice). Thus, the image size (F_Src.w, h) is set as the size of the intermediate resolution (Mid.w, h). Also, the second image parameters including this intermediate resolution size and the output display parameters are supplied to the enlargement scaler unit 113, and are set therein.

As described above, in the animation display process shown in FIG. 19, a size with a margin size is set as the intermediate resolution, as a sufficient margin size obtained in the margin size setting process shown in FIG. 18 is used. Thus, the enlargement scaler unit 113 can smoothly update the display size of the output image (display image), and achieve smooth animation display. That is, in the animation display process shown in FIG. 19, the reduction scaler unit 111 in the stage before the memory unit 112 maintains an output size not larger than the size of the input image, while the enlargement scaler unit 113 maintains an output size not smaller than the size of the memory-held image.

In this example, after the animation display shown in FIG. 19 ends, the non-animation display process shown in FIG. 20 (postprocessing for the animation display) is performed. It should be noted that, in this example, time t58 in FIG. 19 (FIG. 20) is the ending time of the animation display, and time t59 in FIG. 20 is the starting time of the non-animation display.

Specifically, at time t59, the enlargement scaler unit 113 supplies the first image parameters, which include the output display parameters (B_Ani[04].x, y, w, h), the animation flag, and the initial flag, to the reduction scaler unit 111. It should be noted that the image processing device 100 is operating in the non-animation display mode in this example, and therefore, the animation flag and the initial flag are off.

The reduction scaler unit 111 compares the input image parameters (F_Src.x, y, w, h) with the output display parameters (B_Ani[04].x, y, w, h), and selects the smaller size (the smallest size) from the sizes included in those parameters (two-alternative choice). In this example, the image size in the input image parameters is smaller than the display size in the output display parameters, and therefore, the image size (F_Src.w, h) in the input image parameters is selected (two-alternative choice) and is set as the size of the intermediate resolution (Mid.w, h).

Also, when the reduction scaler unit 111 sets the intermediate resolution, the display size in the output display parameters to be returned to the enlargement scaler unit 113 is set in the image parameter transmission system. The reduction scaler unit 111 supplies the second image parameters to the enlargement scaler unit 113. These second image parameters include the size of the intermediate resolution (F_Src.w, h) and the output display parameters (B_Ani[04] .x, y, w, h).

At time t60, the enlargement scaler unit 113 sets the size of the intermediate resolution (F_Src.w, h) and the output display parameters (B_Ani[04].x, y, w, h) of the output image (display image), in accordance with the second image parameters supplied from the reduction scaler unit 111. In this example, the display size of the output image is larger than the size of the intermediate resolution. Therefore, the enlargement scaler unit 113 performs an image enlargement process to enlarge the memory-held image (having the size of the intermediate resolution) read from the memory unit 112 to the display size of the output image, and outputs the enlarged output image. As a result, the operation mode switches from the animation display mode to the non-animation display mode in the image processing device 100.

As described above, in the transition at the time of an image enlargement transition in animation display, a sufficient margin size obtained in the margin size setting process performed as preprocessing for the animation display is used, so that a size with a margin size is set as the intermediate resolution. Accordingly, the display size of the output image (display image) can be smoothly updated (enlarged) even when the input and output frame frequencies are different. Thus, smooth animation display can be achieved.

<3. Specific Configuration for Achieving Interlocked Operations of the Scaler Units>

(Specific Implementation Method)

The image parameter transfer for enabling the above described scaler units to operate in conjunction with each other can be performed by hardware or software.

(Example Configuration of Hardware)

Figure 21:
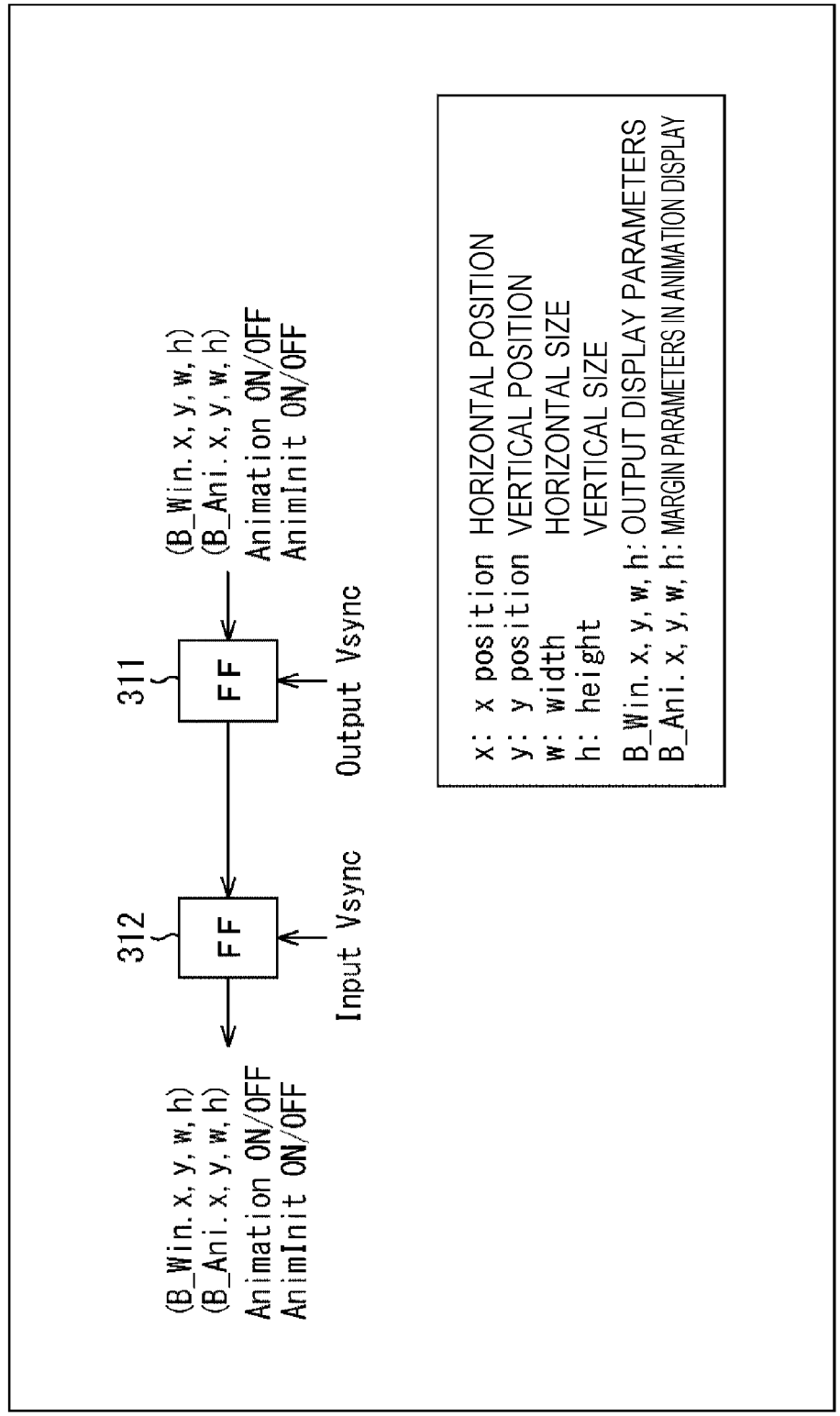
FIG. 21 is a diagram showing a configuration in a case where the image parameter transfer for enabling the scaler units to operate in conjunction with each other is performed by hardware.

FIG. 21 shows a configuration in a case where the image parameter transfer for enabling the scaler units to operate in conjunction with each other is performed by hardware. FIG. 21 shows a hardware configuration for transferring the first image parameters from the enlargement scaler unit 113 to the reduction scaler unit 111.

In FIG. 21, shortly before (a few milliseconds before, for example) the timing indicated by a vertical synchronization signal on the output side (Output Vsync), the software that controls the enlargement scaler unit 113 writes the first image parameters into a register. The first image parameters are then latched in a flip-flop 311 at the timing indicated by the vertical synchronization signal on the output side. After that, the output is latched in a flip-flop 312 at the timing of a vertical synchronization signal on the input side (Input Vsync). Then, shortly after (or immediately after) the timing indicated by the vertical synchronization signal on the input side, the first image parameters from the register are read by the software that controls the reduction scaler unit 111.

As the first image parameters are exchanged in such a hardware configuration, the reduction scaler unit 111 and the enlargement scaler unit 113 operate in conjunction with each other. It should be noted that, although a hardware configuration for transferring the first image parameters is shown in FIG. 21, a configuration for transferring the second image parameters from the reduction scaler unit 111 to the enlargement scaler unit 113 may be formed by hardware.

(Example Configuration of Software)

Figure 22:
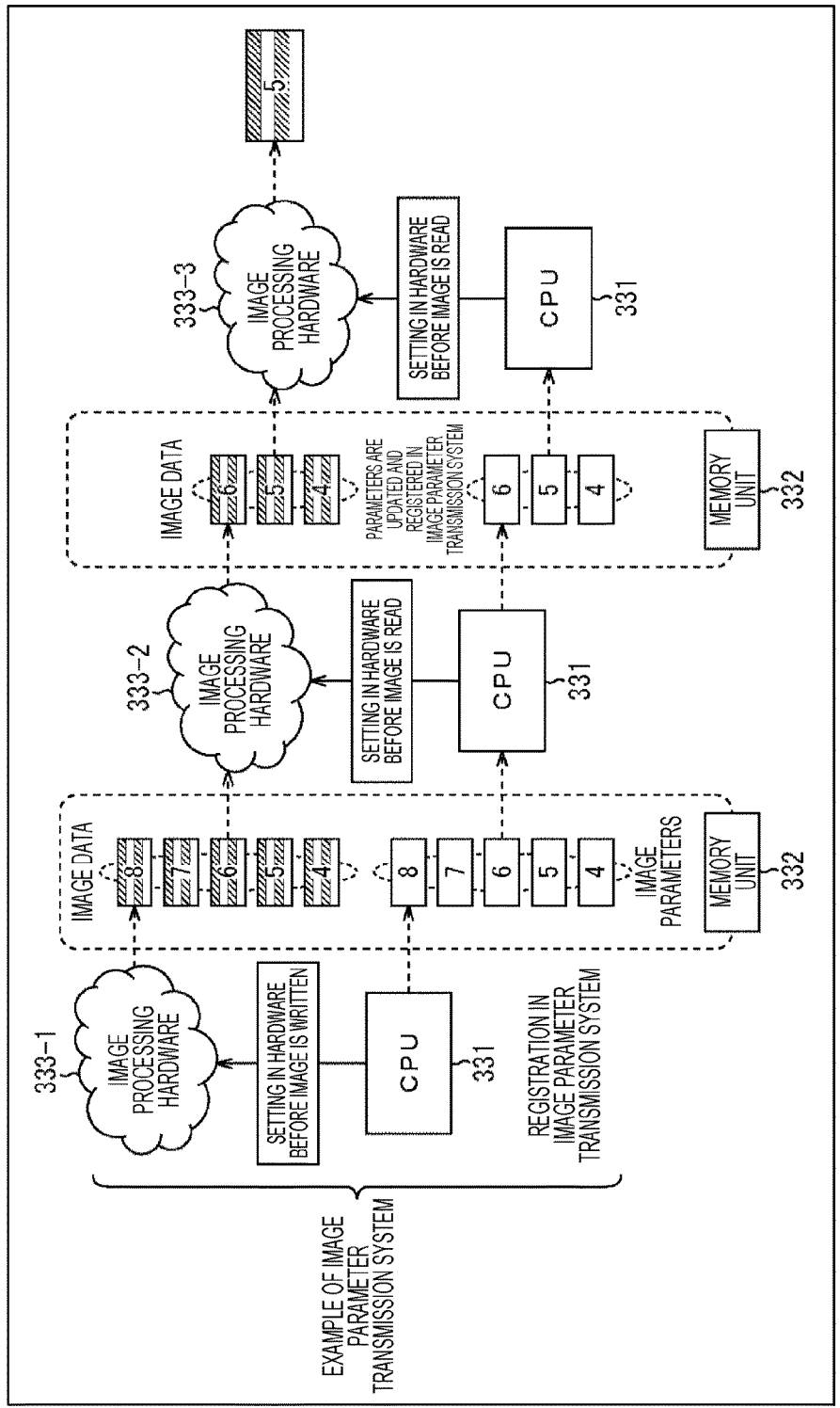
FIG. 22 is a diagram showing a configuration in a case where the image parameter transfer for enabling the scaler units to operate in conjunction with each other is performed by software.

FIG. 22 shows a configuration in a case where the image parameter transfer for enabling the scaler units to operate in conjunction with each other is performed by software. FIG. 22 shows a software configuration for transferring the second image parameters from the reduction scaler unit 111 to the enlargement scaler unit 113.

It should be noted that, in the embodiment of the present technology, this mechanism of software is referred to as the "image parameter transmission system". The image parameter transmission system is a system that manages image data (picture images) and image parameters in one-to-one correspondence. With this system, the second image parameters to be used for the image data stored in the memory unit 112 are transferred from the reduction scaler unit 111 to the enlargement scaler unit 113.

In the image parameter transmission system shown in FIG. 22, when image processing is performed on image data via a memory unit 332, a CPU 331 performs image data control on image processing hardware 333-1 in the stage before the memory unit 332, to control the image data to be written into the memory unit 332. At the same time, the CPU 331 also stores the image parameters related to the image data into the memory unit 332, so that the image data and the image parameters are managed by software.

Also, in a case where image processing hardware 333-2 (333-3) in the stage after the memory unit 332 reads image data stored in the memory unit 332, the CPU 331 reads the image parameters related to the image data from the memory unit 332, and sets the image parameters in the image processing hardware 333-2 (333-3). That is, the CPU 331 acquires the image parameters related to the current image data to be subjected to image processing, before the image processing is performed by the image processing hardware 333-2 (333-3). The CPU 331 then sets the image parameters in the image processing hardware 333-2 (333-3) before the image processing is performed.

By virtue of this, the image processing hardware 333-2 (333-3) can reflect the image parameters set by the CPU 331 in performing image processing on the image data read from the memory unit 332. It should be noted that the image parameters to be used in the image parameter transmission system include size, format, and a write address, for example.

Then, in the image processing device 100, the principles of this image parameter transmission system are used in transferring the second image parameters. That is, where the memory unit 332 in FIG. 22 is equivalent to the memory unit 112 in FIG. 5, the image processing hardware 333-1 in FIG. 22 is equivalent to the reduction scaler unit 111 in FIG. 5, the image processing hardware 333-2 in FIG. 22 is equivalent to the enlargement scaler unit 113 in FIG. 5, and the CPU 331 in FIG. 22 is provided inside the image processing device 100 in FIG. 5, the second image parameters for the current image data to be subjected to image processing can be transferred to the enlargement scaler unit 113.

As the first image parameters and the second image parameters are exchanged in such a software configuration, the reduction scaler unit 111 and the enlargement scaler unit 113 operate in conjunction with each other. It should be noted that, although a software configuration for transferring the second image parameters is shown in FIG. 22, a configuration for transferring the first image parameters from the enlargement scaler unit 113 to the reduction scaler unit 111 may also be formed by software.

(Method of Determining the Margin Size)

Figure 23:
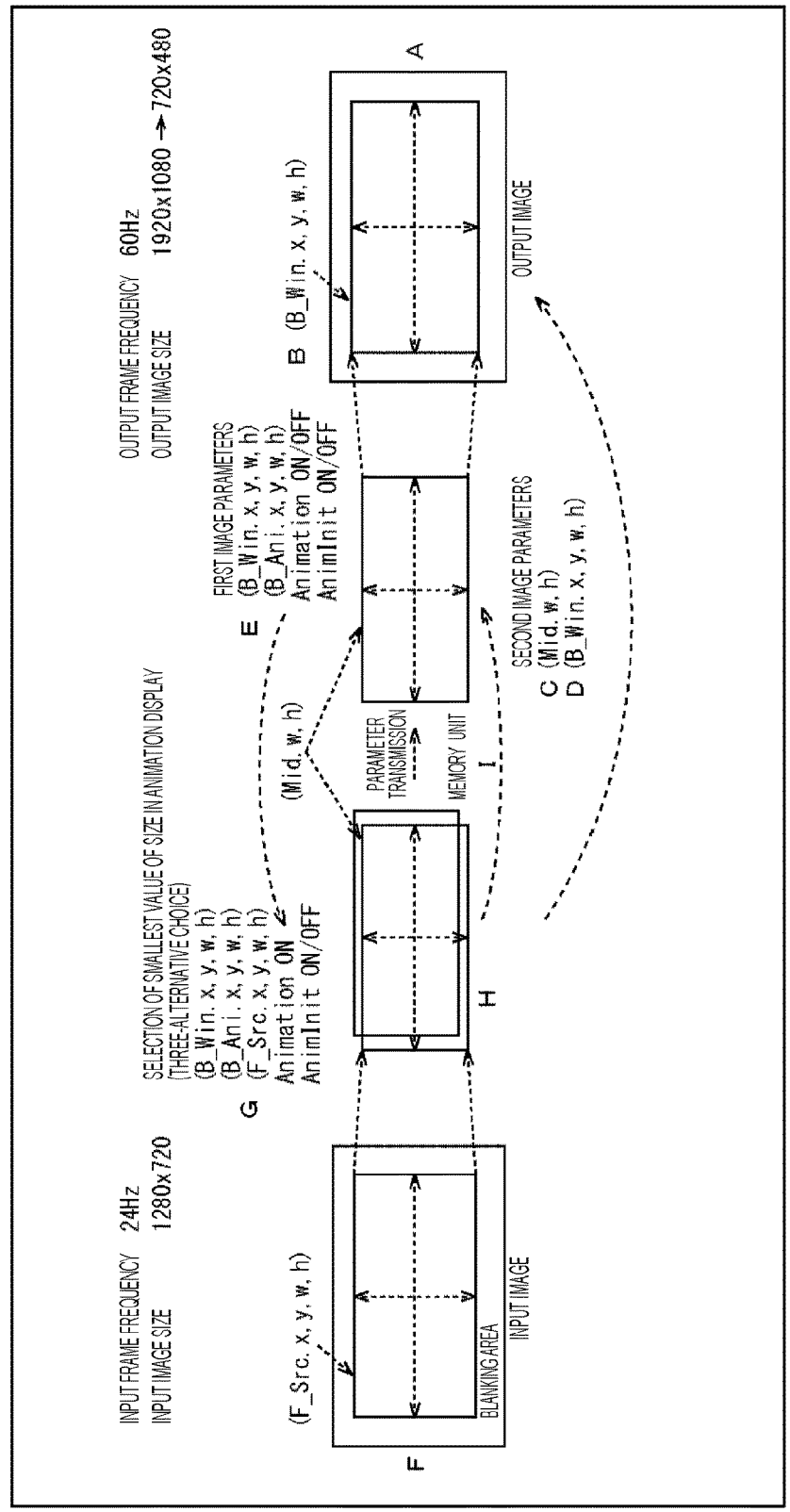
FIG. 23 is a diagram for explaining a method of determining the margin size in animation display.
Figure 24:
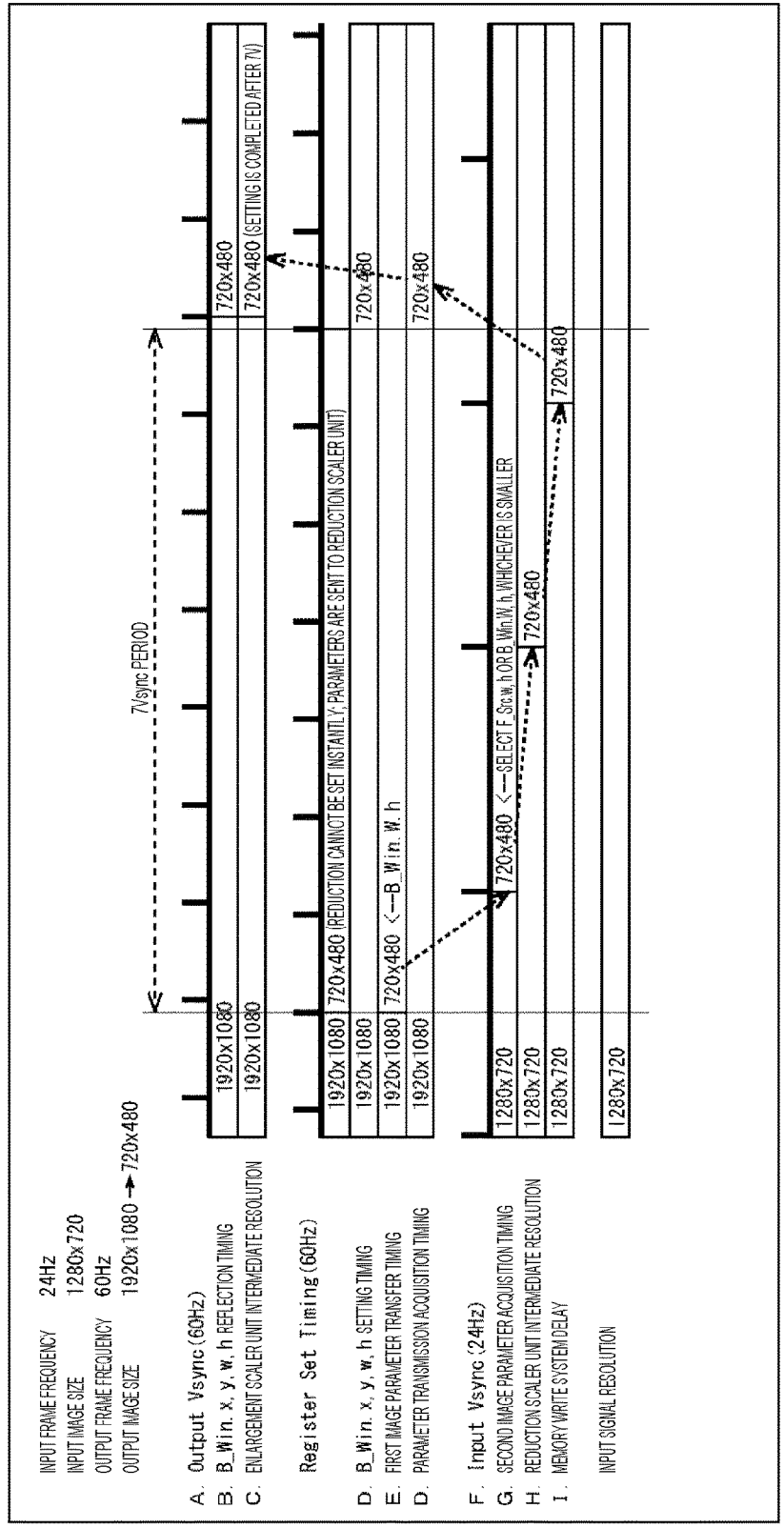
FIG. 24 is a diagram for explaining the method of determining the margin size in animation display.

Referring now to FIGS. 23 and 24, the method of determining the margin size in animation display is described. It should be noted that the alphabets "A" through "I" in FIGS. 23 and 24 indicate that the contents in these drawings correspond to each other.

In the example described above, 8V is set as the margin size in the margin size setting process. However, the margin size of 8V was determined through a specific simulation conducted by the inventor of the present technology. That is, the inventor of the present technology paid attention to the time required for the second image parameters to be returned from the reduction scaler unit 111 to the enlargement scaler unit 113 when the first image parameters were transferred from the enlargement scaler unit 113 to the reduction scaler unit 111, and determined the margin size of 8V from the required time.

Specifically, FIG. 23 shows that the reduction scaler unit 111 and the enlargement scaler unit 113 operate in conjunction with each other by exchanging the first image parameters and the second image parameters. Meanwhile, the timing chart in FIG. 24 shows the time required for the second image parameters to be returned from the reduction scaler unit 111 to the enlargement scaler unit 113 when the first image parameters are transferred from the enlargement scaler unit 113 to the reduction scaler unit 111, in a case where the vertical synchronization signal on the input side (Input Vsync) is at 24 Hz (the input image size being 1280×720), and the vertical synchronization signal on the output side (Output Vsync) is at 60 Hz (the display size changing from 1920×1080 to 720×480).

As shown in the timing chart in FIG. 24, 7V after the first image parameters are transferred from the enlargement scaler unit 113 to the reduction scaler unit 111, the second image parameters from the reduction scaler unit 111 are transferred to the enlargement scaler unit 113. Here, the margin size of 8V is determined, as a margin is added to 7V. That is, a margin is added to 7V, in view of the input and output frequencies and the influence of a system delay or the like in writing into or reading from the memory unit 112. Alternatively, it is possible to implement a method of determining the margin size to be a size as small as a few percent to a few tens of percent of the display size of the output image (display image). However, to prevent image quality degradation (to achieve higher image quality), there is a need to perform control so that operation is performed in the smallest possible size setting, which is 8V.

(Method of Calculating the Display Position and the Display Size of a Display Image in Animation Display)

Referring now to FIGS. 25 through 28, a method of calculating the display position and the display size of a display image (output image) in animation display is described.

(Animation Display Based on Linear Characteristics)

Figure 25:
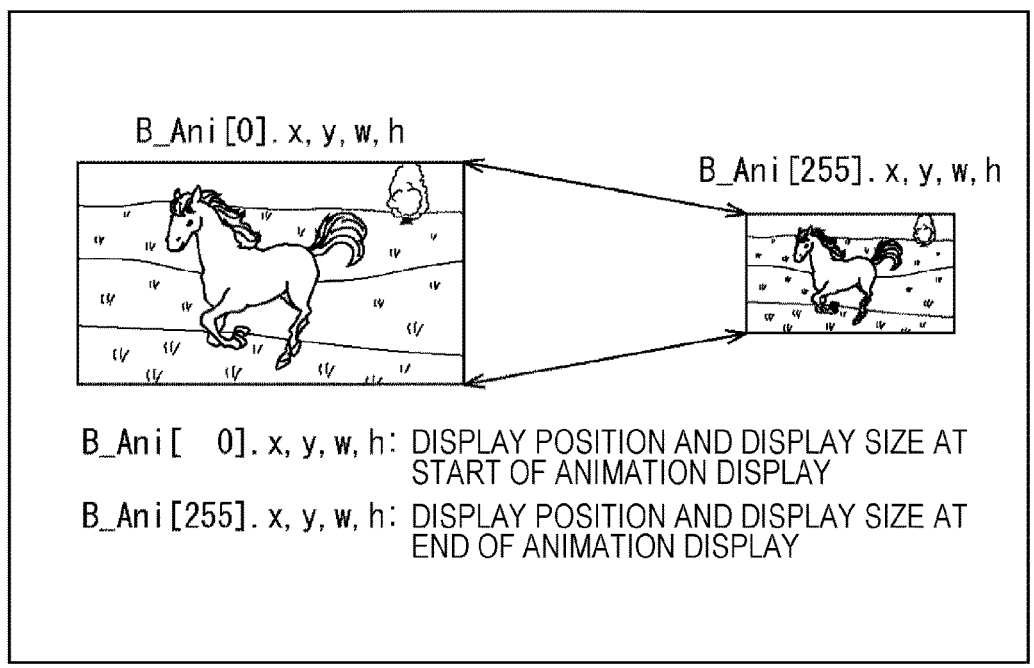
FIG. 25 is a diagram showing animation display based on linear characteristics.

FIG. 25 shows animation display based on linear characteristics.

Figure 26:
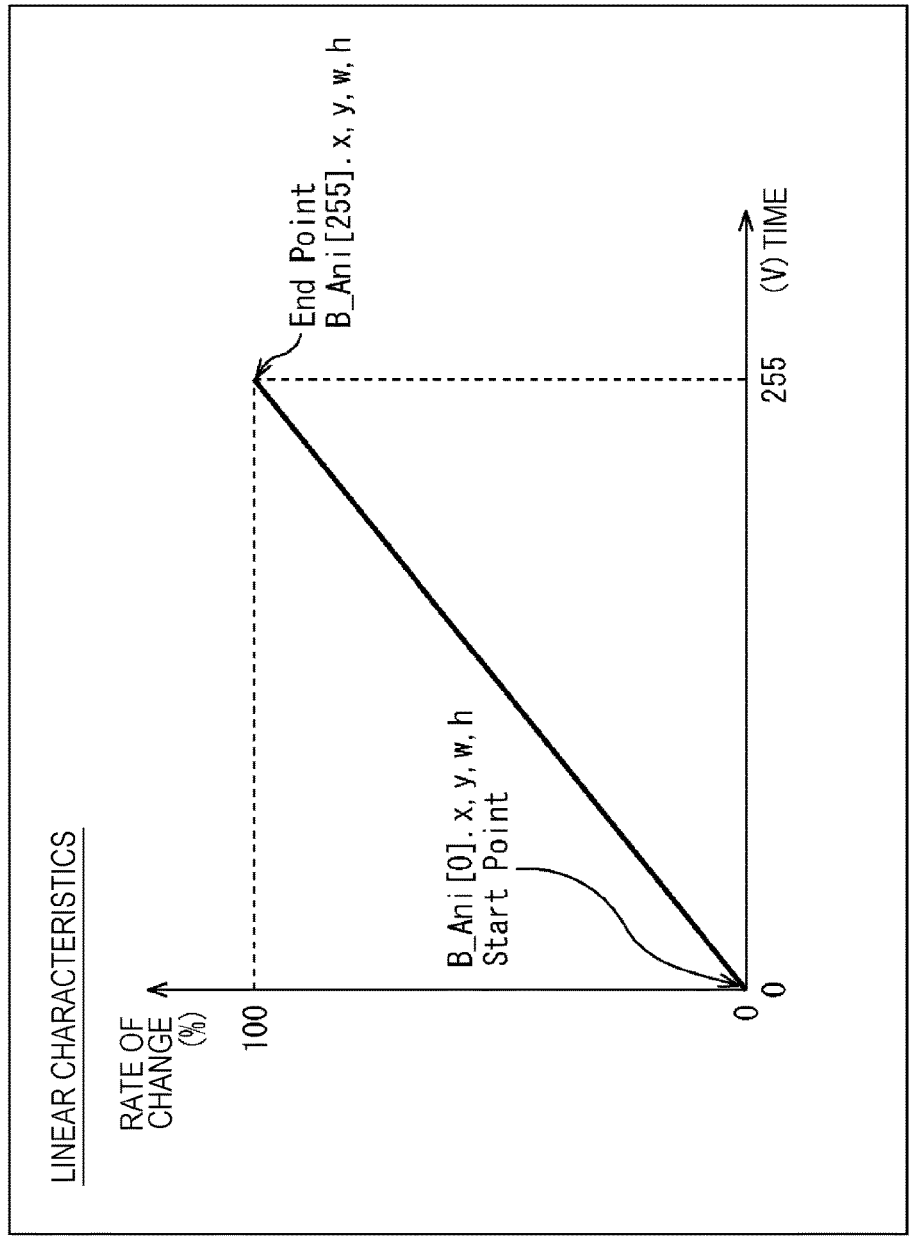
FIG. 26 is a diagram showing a linear characteristics animation display table.

In FIG. 25, animation display is being performed, and therefore, the display position and the display size of the display image are indicated by margin parameters. In this example, the linear characteristics animation display table shown in FIG. 26 is used. Since the relationship between time and the rate of change is a linear relationship, the display image changes its display position and display size at a constant rate.

For example, where the margin parameters at the start of animation display and at the end of the animation display are set as B_Ani[0].x, y, w, h, and B_Ani[255].x, y, w, h, the margin parameters change from B_Ani[0].x, y, w, h to B_Ani[255].x, y, w, h, according to the linear characteristics animation display table in FIG. 26. As a result, the display image in FIG. 25 changes its display position and display size at a constant rate, and the display size is reduced.

It is also possible to calculate the margin size (8V later, for example) in animation display by taking advantage of such a mechanism. It should be noted that, in a case where the value to be obtained 8V later is outside the table characteristics range defined in the linear characteristics animation display table in FIG. 26, for example, a limiting process is performed with the position and the size value at the end of the display.

(Animation Display Based on Quadratic Curve Characteristics)

Figure 27:
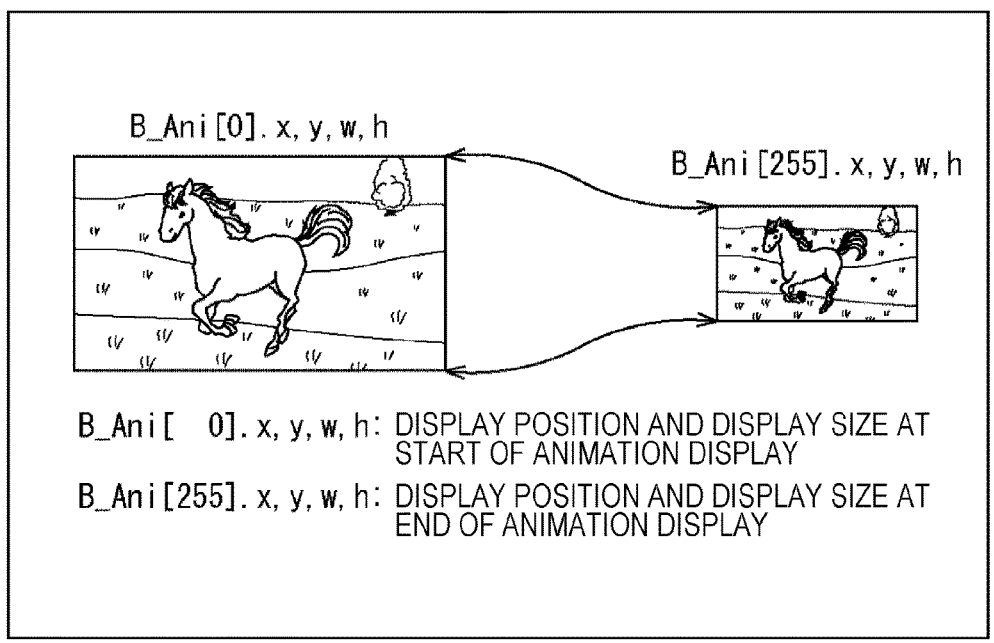
FIG. 27 is a diagram showing animation display based on quadratic curve characteristics.

FIG. 27 shows animation display based on quadratic curve characteristics.

Figure 28:
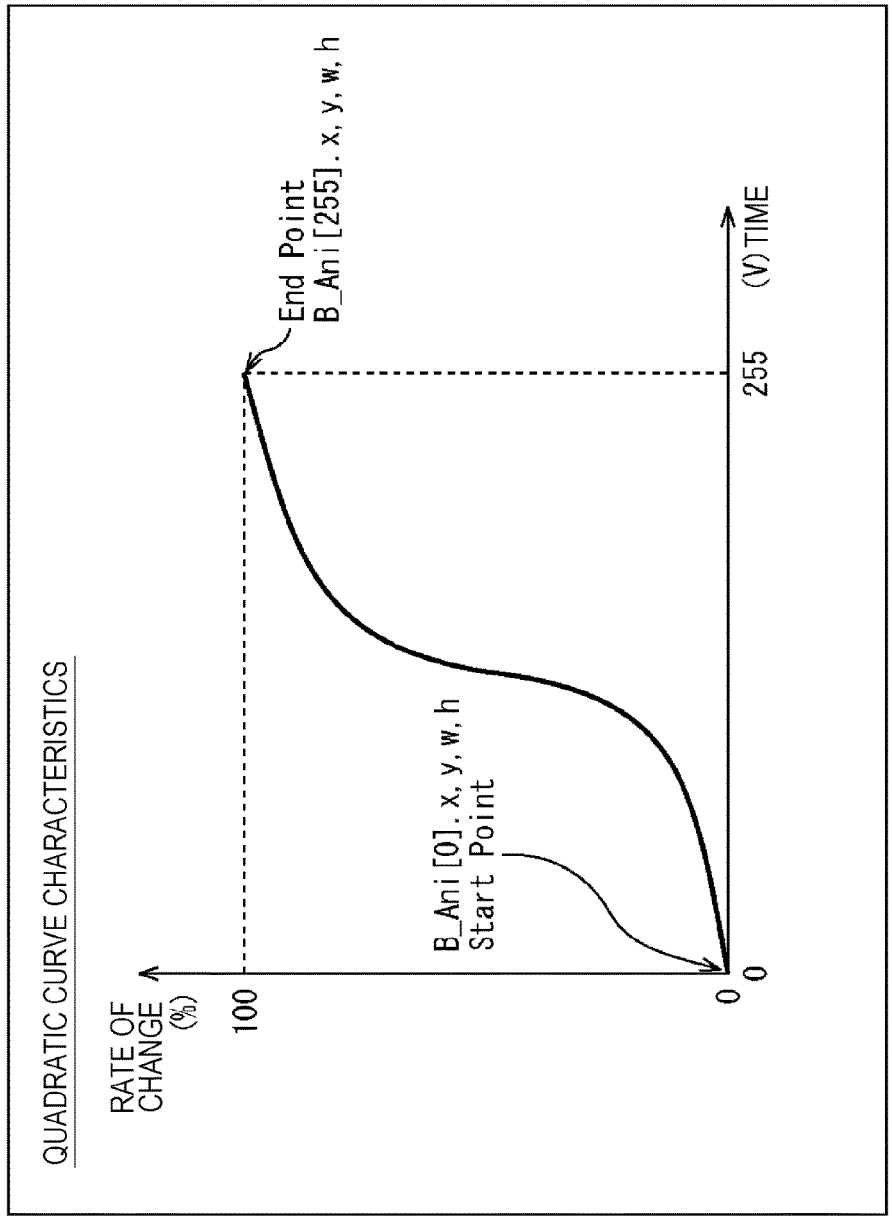
FIG. 28 is a diagram showing a quadratic curve characteristics animation display table.

In FIG. 27, animation display is being performed, and therefore, the display position and the display size of the display image are indicated by margin parameters. In this example, the quadratic curve characteristics animation display table shown in FIG. 28 is used. Since the relationship between time and the rate of change is a non-linear relationship, the display image changes its display position and display size at a constant rate.

For example, where the margin parameters at the start of animation display and at the end of the animation display are set as B_Ani[0].x, y, w, h, and B_Ani[255].x, y, w, h, the margin parameters change from B_Ani[0].x, y, w, h to B_Ani[255].x, y, w, h, according to the quadratic curve characteristics animation display table in FIG. 28. As a result, the display image in FIG. 27 changes its display position and display size at an accelerated rate in a certain area, for example, and the display size is reduced.

It is also possible to calculate the margin size (8V later, for example) in animation display by taking advantage of such a mechanism. It should be noted that, in a case where the value to be obtained 8V later is outside the table characteristics range defined in the quadratic curve characteristics animation display table in FIG. 28, for example, a limiting process is performed with the position and the size value at the end of the display.

<4. Flow of a Scaling Process>

(Scaling Process)

Figure 29:
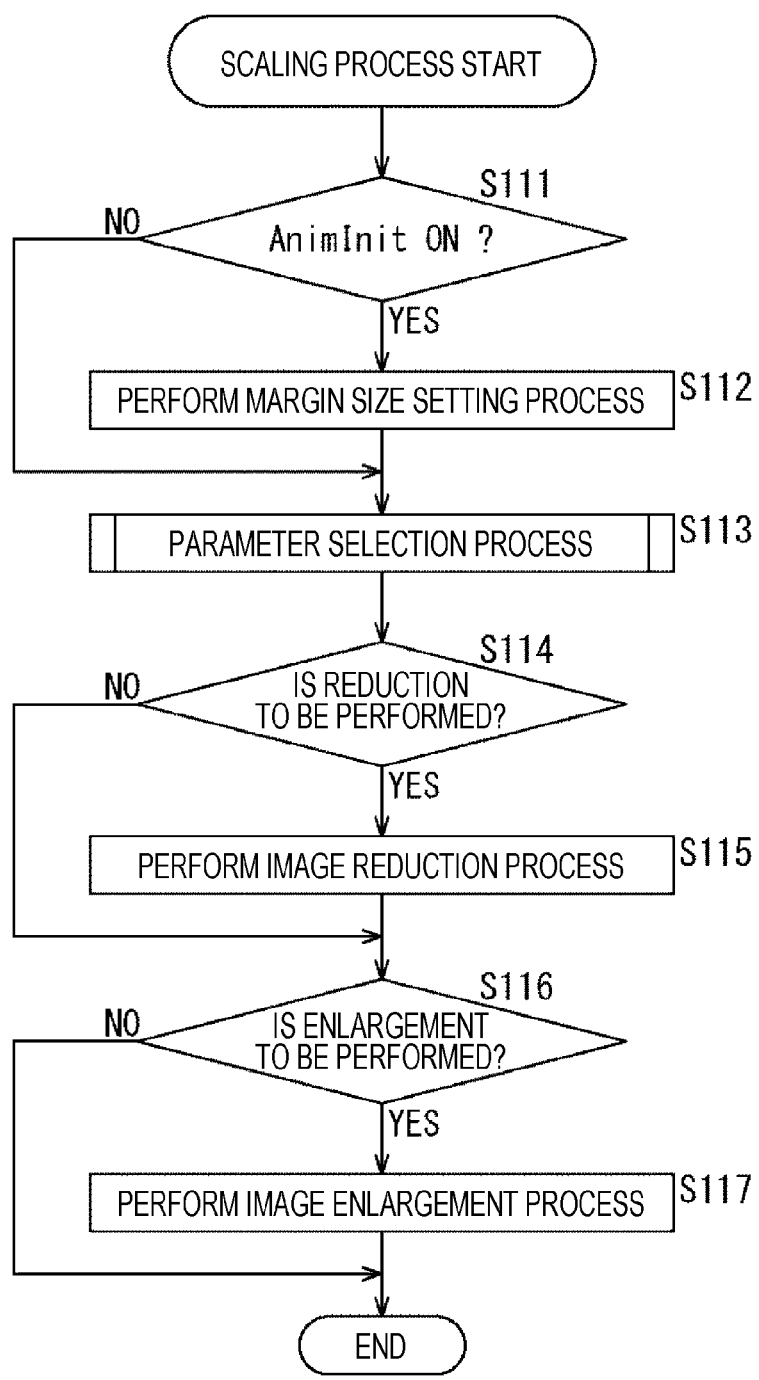
FIG. 29 is a flowchart for explaining a scaling process.

Referring first to the flowchart in FIG. 29, a scaling process to be performed by the image processing device 100 shown in FIG. 5 is described.

In step S111, a check is made to determine whether the initial flag (AnimInit) is on. If the initial flag is determined to be on in step S111, the process moves on to step S112. In step S112, a margin size setting process is performed. As this margin size setting process, a process similar to the margin size setting process shown in FIG. 15 or 18 is performed. As the margin size setting process is performed, a size with a margin size is set as the size of the intermediate resolution, and the preparation for animation display is performed.

After the processing in step S112 is completed, the process moves on to the step S113. Further, if the initial flag is determined to be off in step S111, step S112 is skipped, and the process moves on to the step S113. In step S113, a parameter selection process is performed. As this parameter selection process is performed, the parameters for controlling an image reduction process by the reduction scaler unit 111 and an image enlargement process by the enlargement scaler unit 113 in an interlocking manner are set.

It should be noted that the parameter selection process will be described later in detail with reference to the flowchart in FIG. 30.

In step S114, a check is made to determine whether to reduce the image data of an input image, in accordance with the parameters selected in step S113. If it is determined in step S114 that the image data of the input image is to be reduced, the process moves on to step S115. In step S115, the reduction scaler unit 111 reduces the image data of the input image by performing an image reduction process on the image data of the input image, and writes the image data into the memory unit 112.

It should be noted that, if it is determined in step S114 that the image data of the input image is not to be reduced, step S115 is skipped. In this case, the reduction scaler unit 111 writes the image data of the input image into the memory unit 112, while maintaining the current size of the input image without performing any image reduction process on the image data of the input image.

In step S116, a check is made to determine whether to enlarge the image data of a memory-held image read from the memory unit 112, in accordance with the parameters selected in step S113. If it is determined in step S116 that the image data of the memory-held image is to be enlarged, the process moves on to step S117. In step S117, the enlargement scaler unit 113 enlarges the image data of the memory-held image by performing an image enlargement process on the image data of the memory-held image read from the memory unit 112, and outputs the enlarged image data as the image data of the output image (display image).

It should be noted that, if it is determined in step S116 that the image data of the memory-held image is not to be enlarged, step S117 is skipped. In this case, the enlargement scaler unit 113 outputs the image data of the memory-held image as the image data of the output image (display image), while maintaining the current size of the memory-held image without performing any image enlargement process on the image data of the memory-held image. When the processing in step S117 is completed, the scaling process shown in FIG. 29 comes to an end.

The above described process is the scaling process.

(Parameter Selection Process)

Figure 30:
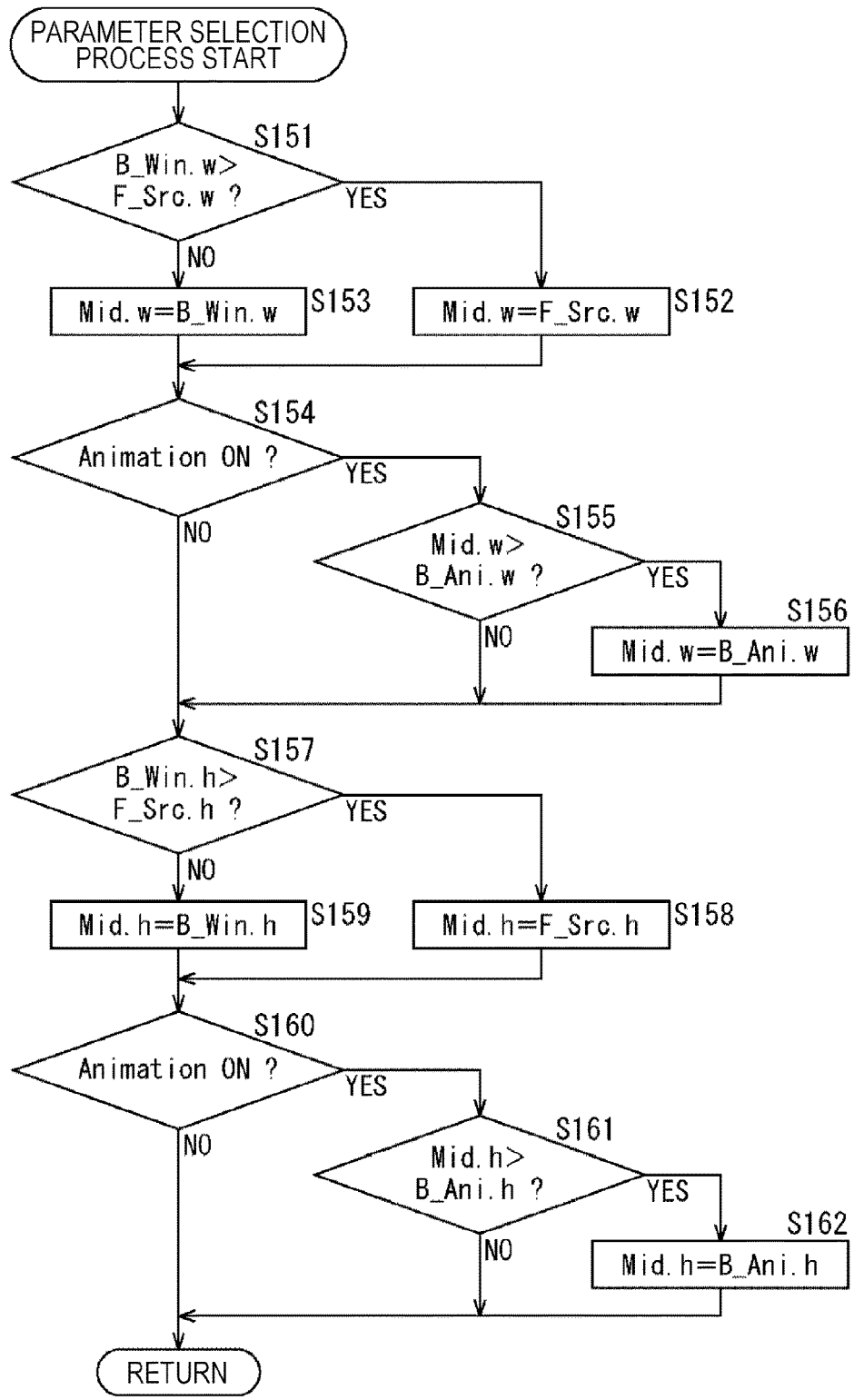
FIG. 30 is a flowchart for explaining a parameter selection process.

Referring now to the flowchart in FIG. 30, the parameter selection process equivalent to the processing in step S113 in FIG. 29 is described. It should be noted that the reduction scaler unit 111 has acquired the first image parameters from the enlargement scaler unit 113, and the input image parameters (F_Src.x, y, w, h), before the parameter selection process is performed.

In step S151, the reduction scaler unit 111 determines whether B_Win.w is greater than F_Src.w. That is, the smallest value between the horizontal size of the input image and the horizontal size of the output image (display image) from the enlargement scaler unit 113 is determined in this step.

If B_Win.w is determined to be greater than F Src.w in step S151, the process moves on to step S152. In step S152, the reduction scaler unit 111 sets F_Src.w as Mid.w. In this case, the horizontal size of the input image is selected as the horizontal size of the intermediate resolution.

Further, if B_Win.w is determined not to be greater than F_Src.w in step S151, the process moves on to step S153. In step S153, the reduction scaler unit 111 sets B_Win.w as Mid.w. In this case, the horizontal size of the output image (display image) is selected as the horizontal size of the intermediate resolution.

After the horizontal size of the input image or the horizontal size of the output image is selected as the horizontal size of the intermediate resolution (two-alternative choice) in step S152 or S153, the process moves on to step S154. In step S154, the reduction scaler unit 111 determines whether the animation flag (Animation) is on.

If the animation flag is determined to be on in step S154, the process moves on to step S155. In step S155, the reduction scaler unit 111 determines whether Mid.w is greater than B_Ani.w. That is, the smallest value between the determined smallest value between the horizontal size of the input image and the horizontal size of the output image, and the horizontal size of the margin parameter size (the margin size) is determined in this step.

If Mid.w is determined to be greater than B_Ani.w in step S155, the process moves on to step S156. In step S156, the reduction scaler unit 111 sets B_Ani.w as Mid.w. In this case, the horizontal size of the margin size is selected as the size of the intermediate resolution.

Further, if Mid.w is determined not to be greater than B_Ani.w in step S155, on the other hand, step S156 is skipped. In this case, the horizontal size of the margin size is not selected as the size of the intermediate resolution, and either the horizontal size of the input image or the horizontal size of the output image is selected as the size of the intermediate resolution.

That is, in a case where the animation flag is on, the horizontal size of the input image, the horizontal size of the output image, or the horizontal size of the margin size is selected as the horizontal size of the intermediate resolution (three-alternative choice).

If the animation flag is determined to be off in step S154, or if Mid.w is determined not to be greater than B_Ani.w in step S155, or when the processing in step S156 is completed, the process moves on to step S157.

As the procedures in steps S151 through S156 are carried out as described above, the smallest horizontal size is calculated and is selected as the horizontal size of the intermediate resolution. Further, likewise, as the procedures in step S157 through S162 are carried out, the smallest vertical size is calculated and is selected as the vertical size of the intermediate resolution.

In step S157, the reduction scaler unit 111 determines whether B_Win.h is greater than F_Src.h. That is, the smallest value between the vertical size of the input image and the vertical size of the output image (display image) from the enlargement scaler unit 113 is determined in this step.

If B_Win.h is determined to be greater than F Src.h in step S157, the process moves on to step S158. In step S158, the reduction scaler unit 111 sets F_Src.h as Mid.h. In this case, the vertical size of the input image is selected as the vertical size of the intermediate resolution.

Further, if B_Win.h is determined not to be greater than F_Src.h in step S157, on the other hand, the process moves on to step S159. In step S159, the reduction scaler unit 111 sets B_Win.h as Mid.h. In this case, the vertical size of the output image (display image) is selected as the vertical size of the intermediate resolution.

After the vertical size of the input image or the vertical size of the output image is selected as the vertical size of the intermediate resolution (two-alternative choice) in step S158 or S159, the process moves on to step S160. In step S160, the reduction scaler unit 111 determines whether the animation flag (Animation) is on.

If the animation flag is determined to be on in step S160, the process moves on to step S161. In step S161, the reduction scaler unit 111 determines whether Mid.h is greater than B_Ani.h. That is, the smallest value between the determined smallest value between the vertical size of the input image and the vertical size of the output image, and the vertical size of the margin size is determined.

If Mid.h is determined to be greater than B_Ani.h in step S161, the process moves on to step S162. In step S162, the reduction scaler unit 111 sets B_Ani.h as Mid.h. In this case, the vertical size of the margin size is selected as the size of the intermediate resolution.

Further, if Mid.h is determined not to be greater than B_Ani.h in step S161, on the other hand, step S162 is skipped. In this case, the vertical size of the margin size is not selected as the size of the intermediate resolution, and either the vertical size of the input image or the vertical size of the output image is selected as the size of the intermediate resolution.

That is, in a case where the animation flag is on, the vertical size of the input image, the vertical size of the output image, or the vertical size of the margin size is selected as the vertical size of the intermediate resolution (three-alternative choice).

If the animation flag is determined to be off in step S160, or if Mid.h is determined not to be greater than B_Ani.h in step S161, or when the processing in step S162 is completed, the parameter selection process in FIG. 30 comes to an end. The process then returns to step S113 in FIG. 29, and the procedures thereafter are carried out.

In the above described manner, the reduction scaler unit 111 selects the horizontal size and the vertical size of the intermediate resolution. It should be noted that the reduction scaler unit 111 supplies the enlargement scaler unit 113 with the second image parameters including the size of the intermediate resolution obtained in the parameter selection process shown in FIG. 30.

<5. Configuration of a Receiving Apparatus>

Figure 31:
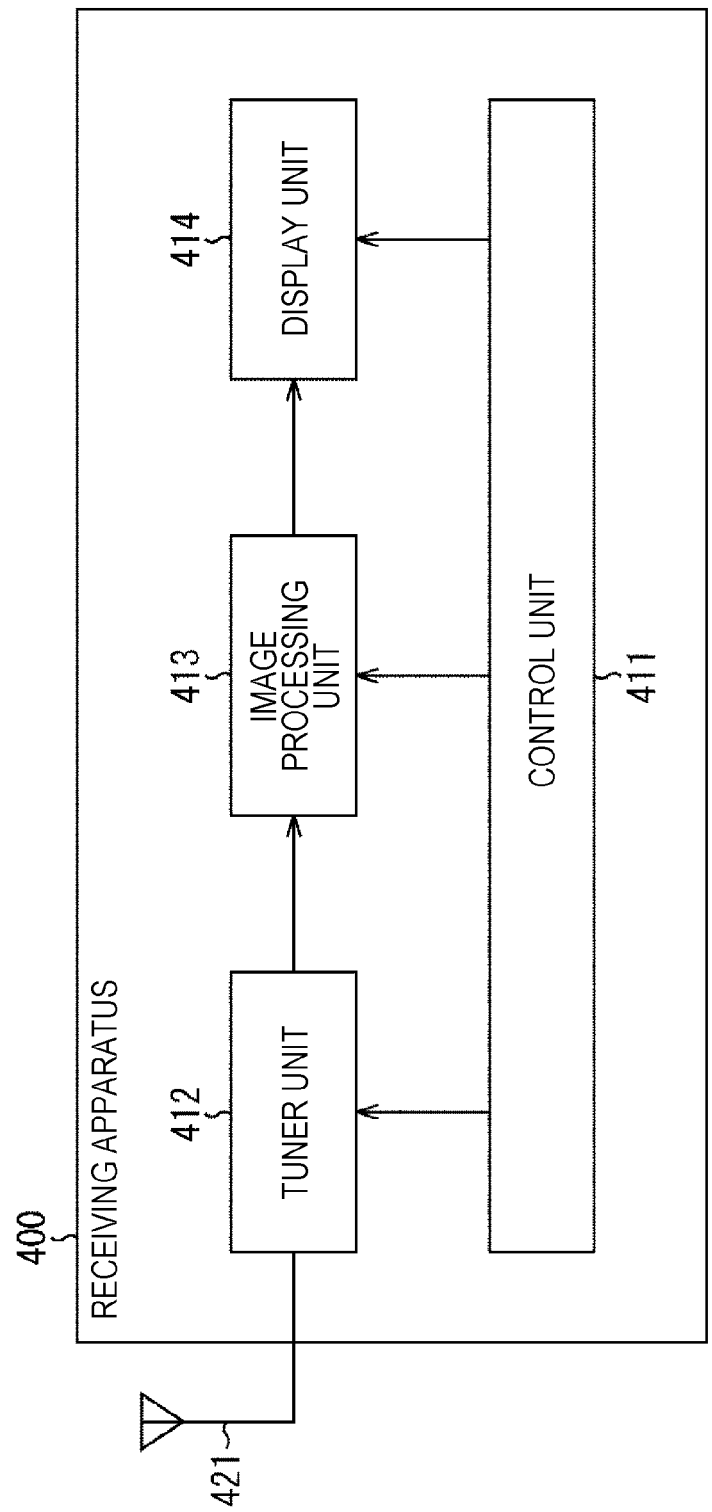
FIG. 31 is a diagram showing the configuration of an embodiment of a receiving apparatus to which the present technology is applied.

FIG. 31 is a diagram showing the configuration of an embodiment of a receiving apparatus to which the present technology is applied.

The receiving apparatus 400 shown in FIG. 31 is an electronic apparatus capable of displaying content with high image quality, such as 4K2K content. The receiving apparatus 400 may be a television receiver, a smartphone, a tablet terminal device, a game machine, or a personal computer, for example. In FIG. 31, the receiving apparatus 400 includes a control unit 411, a tuner unit 412, an image processing unit 413, and a display unit 414.

The control unit 411 controls operations of the respective components of the receiving apparatus 400.

Under the control of the control unit 411, the tuner unit 412 receives a digital broadcast signal via an antenna 421, performs a demodulating process or the like, and supplies the resultant image data to the image processing unit 413.

Under the control of the control unit 411, the image processing unit 413 performs predetermined image processing on the image data of an input image supplied from the tuner unit 412, and causes the display unit 414 to display the display image (output image) obtained as a result of the image processing.

Here, the image processing unit 413 is equivalent to the image processing device 100 described above (FIG. 5), and includes a reduction scaler unit 111, a memory unit 112, and an enlargement scaler unit 113. In the image processing unit 413, the reduction scaler unit 111 and the enlargement scaler unit 113 exchange image parameters, so that an image reduction process by the reduction scaler unit 111 and an image enlargement process by the enlargement scaler unit 113 are performed in conjunction with each other via the memory unit 112.

As described above, in the receiving apparatus 400, the image processing unit 413 performs an image reduction process and an image enlargement process on the image data of an input image. Thus, smooth display can be achieved in animation display of the image data of the input image, and display with high image quality can be achieved in non-animation display. In this manner, both smooth animation display and higher image quality in non-animation display can also be achieved in the receiving apparatus 400.

It should be noted that, in FIG. 31, the receiving apparatus 400 receives the content of a television program or the like transmitted with digital broadcast signals. However, a communication unit having a function to connect to a network such as the Internet may be provided in the receiving apparatus 400, and the communication unit receives content distributed from a streaming server on the Internet, for example, so that animation display or non-animation display of the content can be performed.

It should be noted that the above described series of processes may be performed by hardware or may be performed by software. In a case where the series of processes are performed by software, the program that forms the software may be installed in a computer incorporated into special-purpose hardware, or may be installed from a recording medium into a general-purpose personal computer or the like that can execute various kinds of functions by installing various kinds of programs.

This recording medium is formed with a removable medium that stores programs and is distributed to provide the programs to users separately from computers. Such a removable medium may be a magnetic disk, an optical disk, a magneto-optical disk, a semiconductor memory, or the like. Alternatively, the recording medium may be formed with a ROM or a recording unit or the like that stores programs and is incorporated into computers in advance to be provided to users.

Also, the program for causing a computer to perform the above described series of processes may be installed into the computer through a wired or wireless communication medium, such as a local area network, the Internet, or digital satellite broadcasting, via an interface such as a router or a modem as necessary.

In this specification, the processing steps written in the program for causing a computer to perform various processes are not necessarily carried out in chronological order in accordance with the sequence described as the flowcharts, but include procedures to be carried out in parallel or independently of one another (such as parallel procedures or object-based procedures).

Also, the program may be executed by one computer, or may be executed in a distributive manner by more than one computer. Further, the program may be transferred to a remote computer, and be executed therein.

It should be noted that embodiments of the present technology are not limited to the above described embodiments, and various modifications may be made to them without departing from the scope of the present technology.

The present technology may also be embodied in the configurations described below.

(1)

An image processing device including:

a memory unit that stores image data;

a reduction scaler unit that reduces the image data of an input image or maintains the current size of the image data, and stores the image data into the memory unit; and an enlargement scaler unit that enlarges the image data stored in the memory unit or maintains the current size of the image data, and outputs the image data as the image data of an output image, wherein the reduction scaler unit converts the resolution of the input image to an intermediate resolution in accordance with first parameters related to an image to be supplied from the enlargement scaler unit, the intermediate resolution being a resolution for performing writing on the memory unit, and the enlargement scaler unit converts the intermediate resolution of a memory-held image read from the memory unit to the resolution of the output image, in accordance with second parameters related to an image to be supplied from the reduction scaler unit.

(2)

The image processing device of (1), wherein when in an animation display mode for displaying the output image while continuously changing the display size of the output image in predetermined timing, a margin size is given to the intermediate resolution.

(3)

The image processing device of (2), wherein, when in the animation display mode, the reduction scaler unit selects the size with the smallest value from among the image size of the input image, the display size of the output image, and the margin size, and sets the selected size as the size of the intermediate resolution, and the reduction scaler unit incorporates the size with the smallest value set as the intermediate resolution into the second parameters, and supplies the second parameters to the enlargement scaler unit.

(4)

The image processing device of (3), wherein the enlargement scaler unit incorporates the display size of the output image and the margin size into the first parameters, and supplies the first parameters to the reduction scaler unit.

(5)

The image processing device of any of (2) to (4), wherein the margin size corresponds to the display size of the output image to be displayed later in time.

(6)

The image processing device of any of (3) to (5), wherein when not in the animation display mode, the reduction scaler unit selects the smaller one of the image size of the input image and the display size of the output image, and sets the selected size as the size of the intermediate resolution, and the reduction scaler unit incorporates the smaller size set as the intermediate resolution into the second parameters, and supplies the second parameters to the enlargement scaler unit.

(7)

The image processing device of (6), wherein the enlargement scaler unit incorporates the display size of the output image into the first parameters, and supplies the first parameters to the reduction scaler unit.

(8)

The image processing device of (6) or (7), wherein when not in the animation display mode, only one of an image reduction process by the reduction scaler unit and an image enlargement process by the enlargement scaler unit is performed.

(9)

An image processing method for an image processing device that includes:

a memory unit that stores image data;

a reduction scaler unit that reduces the image data of an input image or maintains the current size of the image data, and stores the image data into the memory unit; and an enlargement scaler unit that enlarges the image data stored in the memory unit or maintains the current size of the image data, and outputs the image data as the image data of an output image, the image processing method including the steps of:

the reduction scaler unit converting the resolution of the input image to an intermediate resolution in accordance with first parameters related to an image to be supplied from the enlargement scaler unit, the intermediate resolution being a resolution for performing writing on the memory unit; and the enlargement scaler unit converting the intermediate resolution of a memory-held image read from the memory unit to the resolution of the output image, in accordance with second parameters related to an image to be supplied from the reduction scaler unit.

(10)

A program for causing a computer to carry out:

an image reduction step of reducing the image data of an input image or maintaining the current size of the image data, and storing the image data into a memory unit; and an image enlargement step of enlarging the image data stored in the memory unit or maintaining the current size of the image data, and outputting the image data as the image data of an output image, wherein the image reduction step converts the resolution of the input image to an intermediate resolution in accordance with first parameters related to an image to be obtained through the image enlargement step, the intermediate resolution being a resolution for performing writing on the memory unit, and the image enlargement step converts the intermediate resolution of a memory-held image read from the memory unit to the resolution of the output image, in accordance with second parameters related to an image to be obtained through the image reduction step.

REFERENCE SIGNS LIST

100 Image processing device
111 Reduction scaler unit
112 Memory unit
113 Enlargement scaler unit
400 Receiving apparatus
411 Control unit
412 Tuner unit
413 Image processing unit
414 Display unit

The invention claimed is:

1. An image processing device comprising:
 a memory unit storing image data;
 a reduction scaler unit configured to reduce image data of an input image or maintain a current size of the image data, and store the image data into the memory unit; and
 an enlargement scaler unit configured to enlarge the image data stored in the memory unit or maintain a current size of the image data, and output the image data as image data of an output image,
 wherein
 the reduction scaler unit converts a resolution of the input image to an intermediate resolution in accordance with first parameters related to an image to be supplied from the enlargement scaler unit, the intermediate resolution being a resolution for performing writing on the memory unit, and
 the enlargement scaler unit converts the intermediate resolution of a memory-held image read from the memory unit to a resolution of the output image, in accordance with second parameters related to an image to be supplied from the reduction scaler unit.

2. The image processing device according to claim 1, wherein when in an animation display mode for displaying the output image while continuously changing a display size of the output image in predetermined timing, a margin size is given to the intermediate resolution.

3. The image processing device according to claim 2, wherein
when in the animation display mode, the reduction scaler unit selects a size with the smallest value from among the image size of the input image, the display size of the output image, and the margin size, and sets the selected size as the size of the intermediate resolution, and
the reduction scaler unit incorporates the size with the smallest value set as the intermediate resolution into the second parameters, and supplies the second parameters to the enlargement scaler unit.

4. The image processing device according to claim 3, wherein the enlargement scaler unit incorporates the display size of the output image and the margin size into the first parameters, and supplies the first parameters to the reduction scaler unit.

5. The image processing device according to claim 2, wherein the margin size corresponds to the display size of the output image to be displayed later in time.

6. The image processing device according to claim 3, wherein
when not in the animation display mode, the reduction scaler unit selects the smaller one of the image size of the input image and the display size of the output image, and sets the selected size as the size of the intermediate resolution, and
the reduction scaler unit incorporates the smaller size set as the intermediate resolution into the second parameters, and supplies the second parameters to the enlargement scaler unit.

7. The image processing device according to claim 6, wherein the enlargement scaler unit incorporates the display size of the output image into the first parameters, and supplies the first parameters to the reduction scaler unit.

8. The image processing device according to claim 7, wherein when not in the animation display mode, only one of an image reduction process by the reduction scaler unit and an image enlargement process by the enlargement scaler unit is performed.

9. An image processing method for an image processing device that includes:
a memory unit storing image data;
a reduction scaler unit configured to reduce image data of an input image or maintain a current size of the image data, and store the image data into the memory unit; and
an enlargement scaler unit configured to enlarge the image data stored in the memory unit or maintain a current size of the image data, and output the image data as image data of an output image,
the image processing method comprising the steps of:
the reduction scaler unit converting a resolution of the input image to an intermediate resolution in accordance with first parameters related to an image to be supplied from the enlargement scaler unit, the intermediate resolution being a resolution for performing writing on the memory unit; and
the enlargement scaler unit converting the intermediate resolution of a memory-held image read from the memory unit to a resolution of the output image, in accordance with second parameters related to an image to be supplied from the reduction scaler unit.

10. A non-transitory, computer-readable medium storing a program for causing a computer to carry out:
an image reduction step of reducing image data of an input image or maintaining a current size of the image data, and storing the image data into a memory unit; and
an image enlargement step of enlarging the image data stored in the memory unit or maintaining a current size of the image data, and outputting the image data as image data of an output image,
wherein
the image reduction step converts a resolution of the input image to an intermediate resolution in accordance with first parameters related to an image to be obtained through the image enlargement step, the intermediate resolution being a resolution for performing writing on the memory unit, and
the image enlargement step converts the intermediate resolution of a memory-held image read from the memory unit to a resolution of the output image, in accordance with second parameters related to an image to be obtained through the image reduction step.

* * * * *